United States Patent
Faulkner

(10) Patent No.: US 11,457,271 B1
(45) Date of Patent: Sep. 27, 2022

(54) DISTRIBUTED UTILIZATION OF COMPUTING RESOURCES FOR PROCESSING COORDINATED DISPLAYS OF VIDEO STREAMS

(71) Applicant: MICROSOFT TECHNOLOGY LICENSING, LLC, Redmond, WA (US)

(72) Inventor: Jason Thomas Faulkner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/315,218

(22) Filed: May 7, 2021

(51) Int. Cl.
*H04N 21/4402* (2011.01)
*H04N 21/44* (2011.01)
*H04N 21/482* (2011.01)
*G06V 20/40* (2022.01)

(52) U.S. Cl.
CPC ......... *H04N 21/4402* (2013.01); *G06V 20/40* (2022.01); *H04N 21/44008* (2013.01); *H04N 21/482* (2013.01)

(58) Field of Classification Search
CPC ...... H04N 7/144; H04N 5/222; H04N 5/2224; H04N 13/239; H04N 13/334; H04N 13/337; H04N 13/363; H04N 7/15; H04N 9/3194
See application file for complete search history.

(56) References Cited

U.S. PATENT DOCUMENTS

| 7,984,179 | B1 | 7/2011 | Huang |
| 9,060,094 | B2 | 6/2015 | Thapa |
| 9,118,801 | B2 | 8/2015 | Tapia et al. |
| 9,509,935 | B2 | 11/2016 | Wilson et al. |
| 9,955,117 | B1 | 4/2018 | Breedvelt-schouten et al. |

(Continued)

OTHER PUBLICATIONS

"Huawei TE30 Videoconferencing Endpoint V500R002C00 Web Online Help", Retrieved from: https://support.huawei.com/enterprise/en/doc/EDOC1000108995?section=j008, Apr. 20, 2018, 7 Pages.

(Continued)

*Primary Examiner* — Samira Monshi
(74) *Attorney, Agent, or Firm* — Scott Y. Shigeta; Newport IP, LLC

(57) ABSTRACT

A system can minimize the use of a central computing resource while detecting and correcting visual anomalies that may result from a compilation of video streams from a variety of sources. The central resource can receive device specification data defining parameters on how remote computers measure image properties and generate video data, e.g., camera sensitivity levels, image generation capabilities, etc. The central resource then uses the device specification data to generate calibration metadata that allows each client device to analyze light levels and generate image data according to a normalized standard. This allows each of the clients to generate more consistent video images to be shared in a video communication session. In some configurations, the calibration metadata causes each client device to make the adjustments automatically, and in some instances, video streams can be corrected according to a ranked list of adjustments.

20 Claims, 17 Drawing Sheets

(56) References Cited

U.S. PATENT DOCUMENTS

| | | | |
|---|---|---|---|
| 2015/0237290 A1* | 8/2015 | Lee .................... | G08C 23/04 |
| | | | 348/570 |
| 2018/0167579 A1* | 6/2018 | Breedvelt-Schouten | .................... |
| | | | G06T 7/00 |
| 2018/0367851 A1 | 12/2018 | Kilar et al. | |
| 2020/0186743 A1* | 6/2020 | Lee .................... | G06T 11/00 |

OTHER PUBLICATIONS

"Increase the Brightness of Your Video in a Webex Meeting or Event", Retrieved from: https://help.webex.com/en-us/mv1ote/Increase-the-Brightness-of-Your-Video-in-a-Webex-Meeting-or-Event, Nov. 10, 2020, 2 Pages.

* cited by examiner

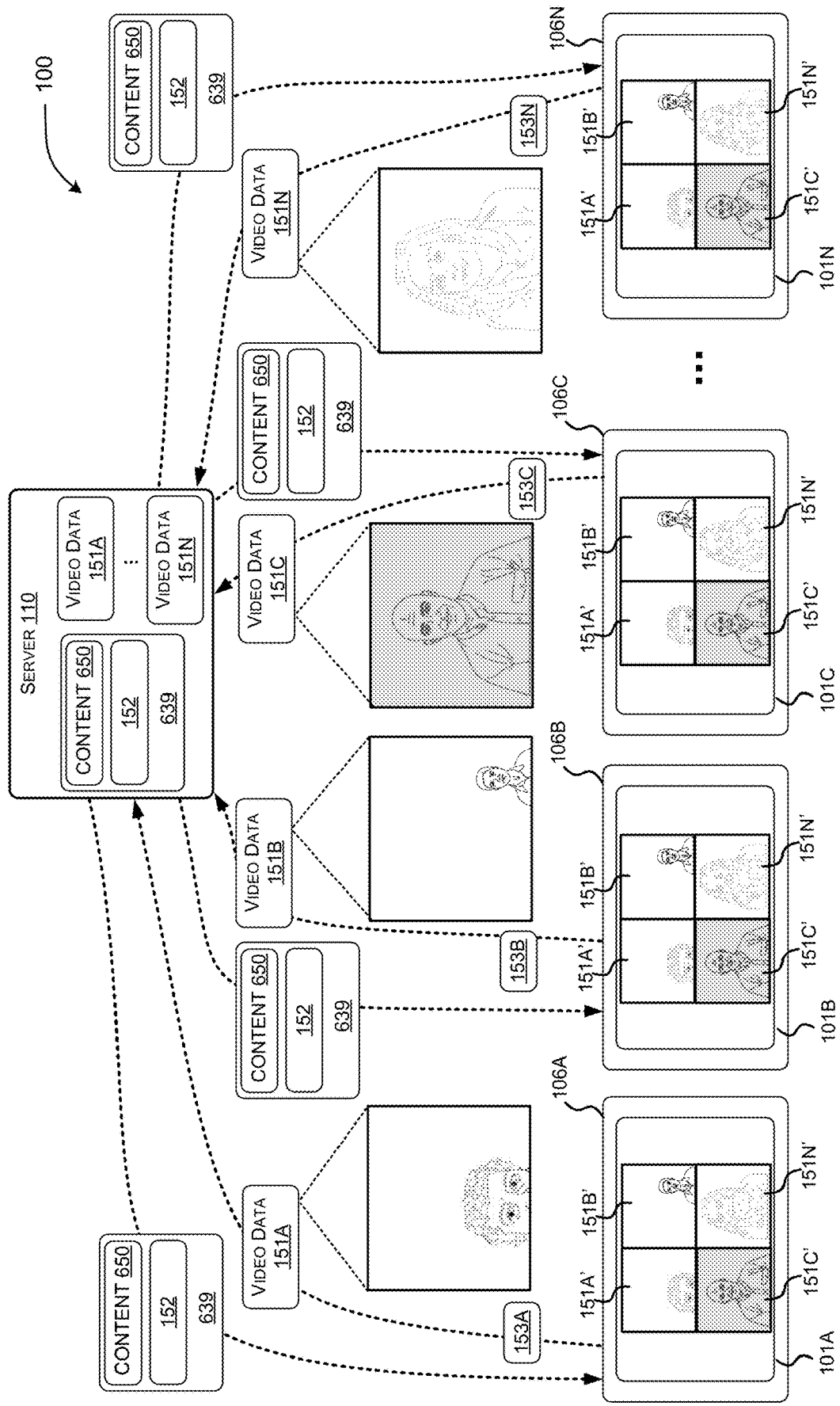

DISTRIBUTED UTILIZATION OF COMPUTING RESOURCES FOR PROCESSING COORDINATED DISPLAYS OF VIDEO STREAMS

BACKGROUND

There are a number of communication systems that allow users to collaborate. For example, some systems allow people to collaborate by the use of live video streams, live audio streams, and other forms of text-based or image-based mediums. Participants of a communication session can share a video stream showing a single person or a group of people with a display of shared content. Such systems can provide participants of a communication session with an experience that simulates an in-person meeting.

Some communication systems generate user interfaces that create a number of visual anomalies. This can occur because such user interfaces are composites of a number of video streams from different computers that are in different physical environments. For example, when a meeting application shares a number of streams each from various locations, e.g., a well-lit office, outdoors, or in a poor-lit area, the user interface presented to each user may not provide a coordinated composite of those streams as there may be a number of lighting anomalies. These anomalies can be furthered when each user is using different camera types, different drivers, and/or different device types that each have a wide range of visual inconsistencies with respect to each user's position, color, and size. As a result, a meeting user interface may include a number of different user renderings, with some being off-center, some too small, while others include improperly cropped images of a user.

Some existing systems address visual anomalies of a conference UI by analyzing and normalizing display characteristics of individual video streams. For instance, a Zoom server can analyze the light levels of a number of incoming streams and adjust light levels in an effort to generate a coordinated UI arrangement. This solution works in some use scenarios, however, this method is computationally expensive and is also inefficient with respect to power consumption since each stream is analyzed and modified by a central server. Also, with an already-existing heavy analysis workload that is required for managing other aspects of a large meeting, some systems cannot keep up with resource consumption that may occur during some events, like a company-wide event. Such existing solutions have proven to be impractical for service providers, as cloud resources are already constrained. Requiring a system to facilitate large-scale, real-time video analysis and video processing for a large number of tenants, each having large events, is impractical and, in some cases, not achievable.

SUMMARY

The techniques disclosed herein provide a system that can detect and correct visual anomalies that may result from a compilation of video streams from a variety of sources while also minimizing the use of a central computing resource of a communication system. The central computing resource can receive device specification data defining parameters on how remote computers measure image properties and generate video data, e.g., camera sensitivity levels, image generation capabilities, etc. The central resource then uses the device specification data to generate calibration metadata, also referred to herein as display requirements, that allows each client device or a server, to analyze light levels and generate image data according to a normalized standard. This allows each of the clients to generate more consistent video images to be shared in a video communication session. In some configurations, the calibration metadata causes each client device to make the adjustments automatically. The calibration metadata can also cause each client device to generate customized recommendations that provide instruction on how to modify a physical arrangement of hardware, e.g., move lights, adjust a light level, place a filter over a lens, etc. By allowing each of the client devices measure and adjust display properties according to a uniform set of display requirements, the system can address visual anomalies created by multiple computing devices without requiring a server to detect or perform those adjustments.

The features disclosed herein provide a number of technical effects. For example, the techniques disclosed herein can mitigate the need for a system to use valuable processing resources of a centrally managed communication system. In one illustrative example, consider an example where each client device of a communication system creates images each having different light levels, some images being much brighter than others, while others have higher contrast levels than others, etc. When each of the video streams created by the client devices are concurrently rendered together in a conference user interface, visual anomalies, e.g., inconsistent light levels or inconsistent renderings having different sizes and positions, Instead of using the processing power of a server to detect and normalize such display characteristics, e.g., resolution, adjust colors and brightness levels of incoming streams, the server can generate cues suggesting how each client can make local modifications to adjust an image of a video stream before the video stream is sent to the server. Some of the modifications can be in form of instructions suggesting changes to an environment, e.g., lighting adjustments, etc.

The techniques disclosed herein also offload processing tasks from a particular set of computers, e.g., a server, by also having the client computers perform an analysis and/or corrections of videos shared by each client device. The server can distribute metadata that defines a number of requirements for a video stream. This metadata allows each client to analyze the streams in a unified manner, even if each client has different types of hardware and different standards. Thus, instead of requiring a server or another specific computing resource to perform the analysis and adjustments to unify video streams for a meeting, the server can send requirements to each client, where the requirements instruct each client parameters how the video should be configured before each stream is sent to the server. The requirements can then enable each client to analyze each video according to a set of uniform parameters and enable each client to adjust the video streams before they are sent to the server.

The adjustments to the video streams can cause client devices to adjust video streams using software that modifies a video stream, e.g., video resolution, change a zoom level, color level or brightness level, etc. Alternatively, the adjustments to the video streams can be in form of displayed cues. For example, the clients can display recommendations to show how a person can position themselves within a viewing area. This allows each client to have more consistent and coordinated displays of each user to optimize the stream. The displayed cues can cause a user to make specific adjustments without requiring each client to use computing resources to make ongoing adjustments to a video stream. For example, a system may draw a silhouette to show a user should be positioned relative to their camera. The silhouette and other simplified directive shapes can show a person how much to move up, move down, etc. The instructions can also tell a person to turn on a light, etc. The generation of a recommendation can improve power consumption of a system by avoiding the need to analyze and process video stream on a continual basis. Manual adjustments can be made which can eliminate the need for computing resources to continually manipulate a video stream.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A is a block diagram of a system for detecting and addressing visual anomalies in video data streams of a communication system.

FIG. 3B shows a second user interface displaying a graphically based recommendation for correcting a positional anomaly of a video stream.

FIG. 3D shows a fourth user interface displaying a recommendation instructing a user to make an adjustment to make local environmental modifications.

DETAILED DESCRIPTION

Figure 1B:
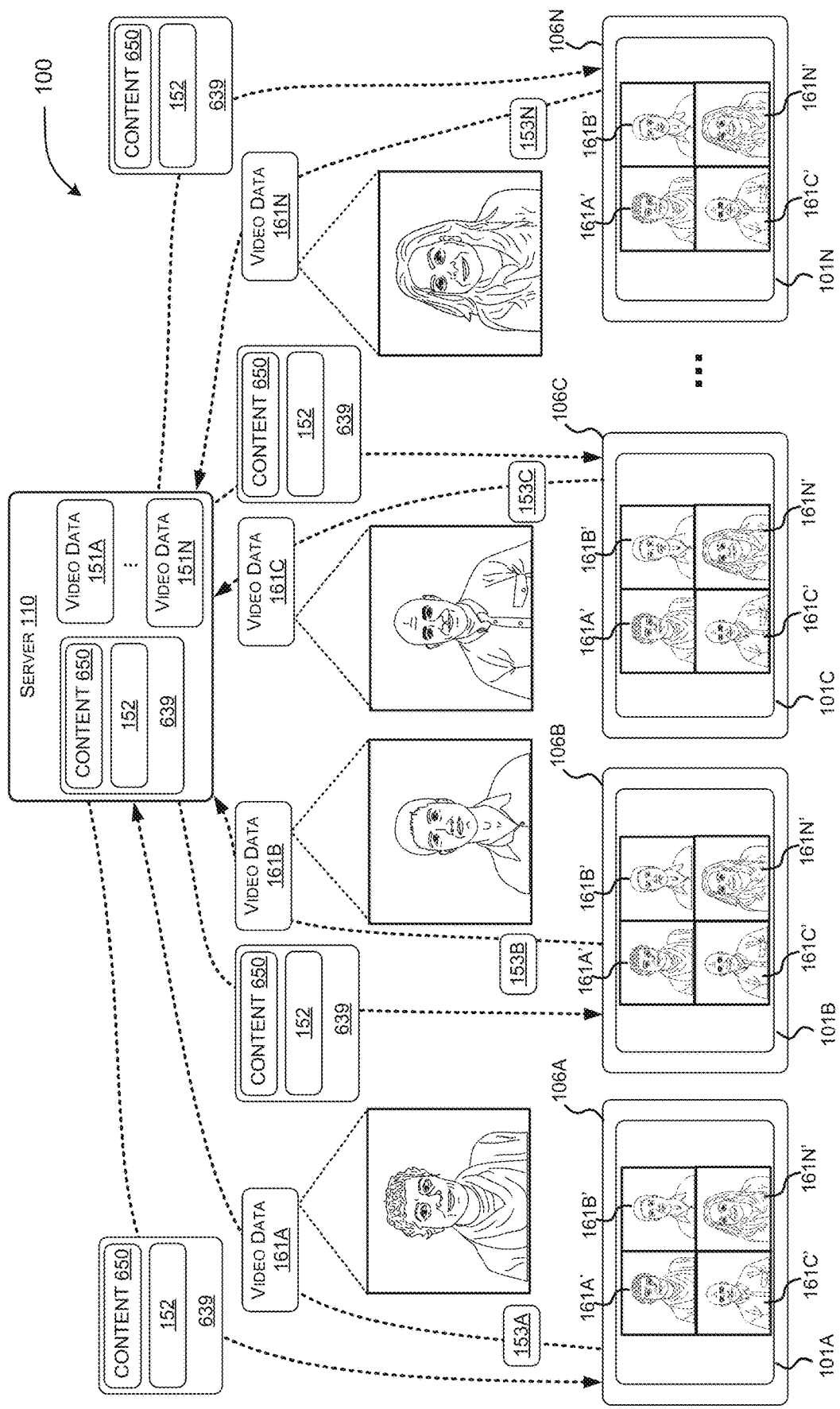
FIG. 1B is a block diagram of a system showing how visual anomalies are corrected in video data streams of a communication system.

FIG. 1A illustrates a system 100 that can detect and correct visual anomalies that may result from a compilation of video streams 151 generated by a number of client computers 106 while reducing the use of computing resources of a server 110. The system 100 can detect and correct visual anomalies, e.g., improper light levels or improper zoom levels, of video streams shared in a communication session according to a normalized standard despite each remote computer having different capabilities. The server 110 can receive device specification data 153 defining parameters on how each client computer 106 measures image properties and generates video data. For instance, the specification data 153 can indicate a camera sensitivity levels, lens dimensions, image generation capabilities of a software application, etc. The specification data 153 can be unique to each client computer. For instance, a first specification data 153A can indicate that a first computer 106A has a laptop camera having a particular model number, while a second specification data 153A can indicate that a second computer 106A has a USB camera having another model number. The server 110 then uses the device specification data 153 to generate calibration metadata 152, also referred to herein as "display requirements 152" or a "set of display requirements 152," that can be configured to cause each client device 106 to analyze images and adjust individual streams video data 151 according to a normalized and coordinated standard.

During operation, the server 110 can send communication data 639 with content data 650 to client computers 106 participating in a communication session. The content data 650 can cause each client computer to display a user interface 101 that includes a collection of a number of renderings 151' of the video data 151 received from each client computer. In this example, video data 151A generated by the first client computer 106A, video data 151B generated by the second client computer 106B, video data 151C generated by the third client computer 106C, and video data 151N generated by the Nth client computer 106N can be processed at the server to create content data 650 that cause each client computer 106 to display respective user interfaces 101A-101N that each comprise a composition of renderings of the video data 151A-151N received at the server 101. Since the video data is generated at each client computer 106 that can include different types of devices, that are also in different environments, as shown in FIG. 1A, the renderings of each video stream may vary greatly with respect to display properties, e.g., camera angles, lighting characteristics, and quality parameters.

The calibration metadata 152 sent with the content data 650 can cause each client computer to analyze renderings 151' and/or adjust the video data 151 generated at each client device using common parameters and criteria. When an individual client computer determines that a rendering 151' and/or the video data generated by that individual client computer meets, or does not meet, one or more criteria defined by the calibration metadata 152, that individual client computer may make adjustments to the video data 151 before the video data 151 is sent to the server 110. This way, each client computer generates and transmits video data having similar characteristics, e.g., camera angles, lighting characteristics, and quality parameters. Thus, when the server generates communication data 639 that compiles the video data 151 received from each client computer to create a user interface 101 of a meeting or other event, the server can share the raw video data sent from each client computer without the need to modify any video data to coordinate the appearance all of the renderings. As described herein, having a user interface 101 on each computer having consistent display characteristics can enhance user engagement and more efficient use of computing resources.

FIG. 1A shows visual anomalies that may result when each client computer 106 operates without utilizing the calibration metadata 152 to coordinate how each client computer measures and processes the video data 151 and the renderings 151'. As shown, some of the renderings, such as the first rendering 151A' and the second rendering 151B', do not have coordinated zoom or crop settings, while other renderings, such as the third rendering 151C' and the Nth rendering 151N', do not have optimal light or contrast levels. However, as shown in FIG. 1B, when each client computer 106 utilizes the calibration metadata 152 to coordinate how each client computer measures and processes the video data 151 to cause each device to generate modified video data 161 configured to cause a display of updated renderings 161'. As shown, the updated renderings 161' can provide more uniform display properties when displayed together. As described in more detail below, the calibration metadata 152 can cause the client computers to detect issues and modify video data 151 while mitigating the use of computing resources at the server 110.

There are a number of technical effects that can result from the techniques disclosed herein. For instance, the features disclosed herein can mitigate redundant use of network, processor, memory, or other computing resources. In one example, in some situations, such as a global epidemic that shifts the way many people communicate, e.g., online meetings, conference calls, broadcasts, and multi-user edit sessions, servers have been pushed to the limits of their capabilities. The configurations disclosed herein can provide a number of technical effects for resource-constrained communication services. For example, the disclosed systems can provide more consistent user interfaces using remote computing resources in a more effective way. By providing more consistent user interfaces across users, a system can improve human interaction and reduce user fatigue with a system. The efficiency is created by offloading the processing of individual video streams to specific client devices during a video conference, by transmitting display metric metadata, also referred to herein as calibration metadata 152, from a server 110 to each client 106. The display metric metadata instructs each client with parameters, also referred to herein as coordinated criteria and thresholds, of how the video should be configured before the stream is sent to the server 110 from each client 106.

As described in more detail below, the techniques disclosed herein can improve human interaction with computers by providing a more consistent user interface that can help users work more efficiently and also reduce fatigue and eyestrain. In addition, in some prior systems, the communication system may rely on client computing devices to process an image prior to sending the image to a server. However, since each remote device may have different types of hardware or different types of software that analyze images differently, some existing systems still produce a number of inconsistencies with respect to video streams provided by each user. As disclosed herein, the use of normalization metadata allows each remote client to coordinate using normalized parameters that produce a high degree of uniformity between streams that are produced by each remote client.

To illustrate aspects of these technical benefits, consider a scenario involving a number of users in an online meeting. In such a scenario, when visual anomalies are caused by streams generated by different types of computing devices, the resulting user interface for each user may appear to be uncoordinated and may cause distractions for the users. Without having a clear and consistent rendering of each user, and in some cases, renderings that don't align properly, the display of video streams in a user interface make it difficult for participants to show and interpret many non-verbal social cues during a video conference.

There are a number of different types of non-verbal social cues such as head nods, facial cues, body language, etc. These non-verbal social cues communicate many different emotions and intentions. For instance, non-verbal social cues can show that a person has an issue, or that a person wants to speak, or that a person agrees or does not agree. These types of gestures are used during in-person meetings to guide various types of interactions. In some cases, non-verbal social cues are so automatic that audience members can even synchronize their breathing pattern to a speaker's breathing pattern. During an in-person meeting, people are constantly interpreting others' eye movements, posture, how their heads are tilted and more, and attributing meaning to those non-verbal cues. But on a video call using a traditional user interface arrangement, those movements aren't diagnostic, meaning they're not providing accurate information about what's going on. Such shortcomings of existing online meeting systems can lead to user fatigue and often lead to a user becoming disengaged. Ultimately, these shortcomings can also lead to inefficient use of a number of resources.

The features disclosed herein provide a number of benefits that helps each participant of a virtual meeting communicate non-verbal cues. For instance, a user interface having renderings that are adjusted according to a coordinated standard can allow proper alignment and scale of renderings. By allowing users to see a more uniform layout of video streams, a system can mitigate user fatigue and promote user engagement, as participants of a communication session are less likely to miss salient information and reduce the need for users to refer to recordings, alternative communication methods, or prolong meetings, all of which can lead to inefficient use of computing resources. By improving user interaction with a computer and by improving user engagement, a system can mitigate the need for redundant use of network, processor, memory, or other computing resources.

These benefits can also reduce the likelihood of inadvertent user inputs and other errors that may result when a user loses engagement, misses social cues, and is required to review recordings and communicate using other resources. When a participant of a video conference misses salient information due to missed social cues, a lack of user engagement, or for other reasons, a system may be required to retrieve, communicate, and process multiple copies of information. In some situations, when a user misses information in a meeting, that user may be required to send emails asking for missed information or access recordings, which may propagate inefficient or redundant use of computing resources. By providing a user interface have a more consistent stream renderings that are properly aligned, a system can promote user engagement and optimize the communication of non-verbal social cues all of which can mitigate inefficient or redundant use of computing resources. In addition, the techniques disclosed herein also can provide these benefits while also enhancing the utilization of distributed resources that optimize and coordinate user interfaces that have a number of video streams from multiple devices. By having client computing devices of a communication system analyze and correct anomalies at the source of a video stream, a system can distribute the workload of processing video images away from a server or a specific client. In addition, the techniques disclosed herein provide another technical effect in that a system can allow client computers to correct a visual anomaly before the video data is generated. This eliminates a need for a server to apply real-time adjustments to video streams after they are generated and sent to a central computing device. Instead, the techniques disclosed herein correct issues at the source before the video stream are generated instead of making retrospective adjustments after errant video data is generated.

Figure 2A:
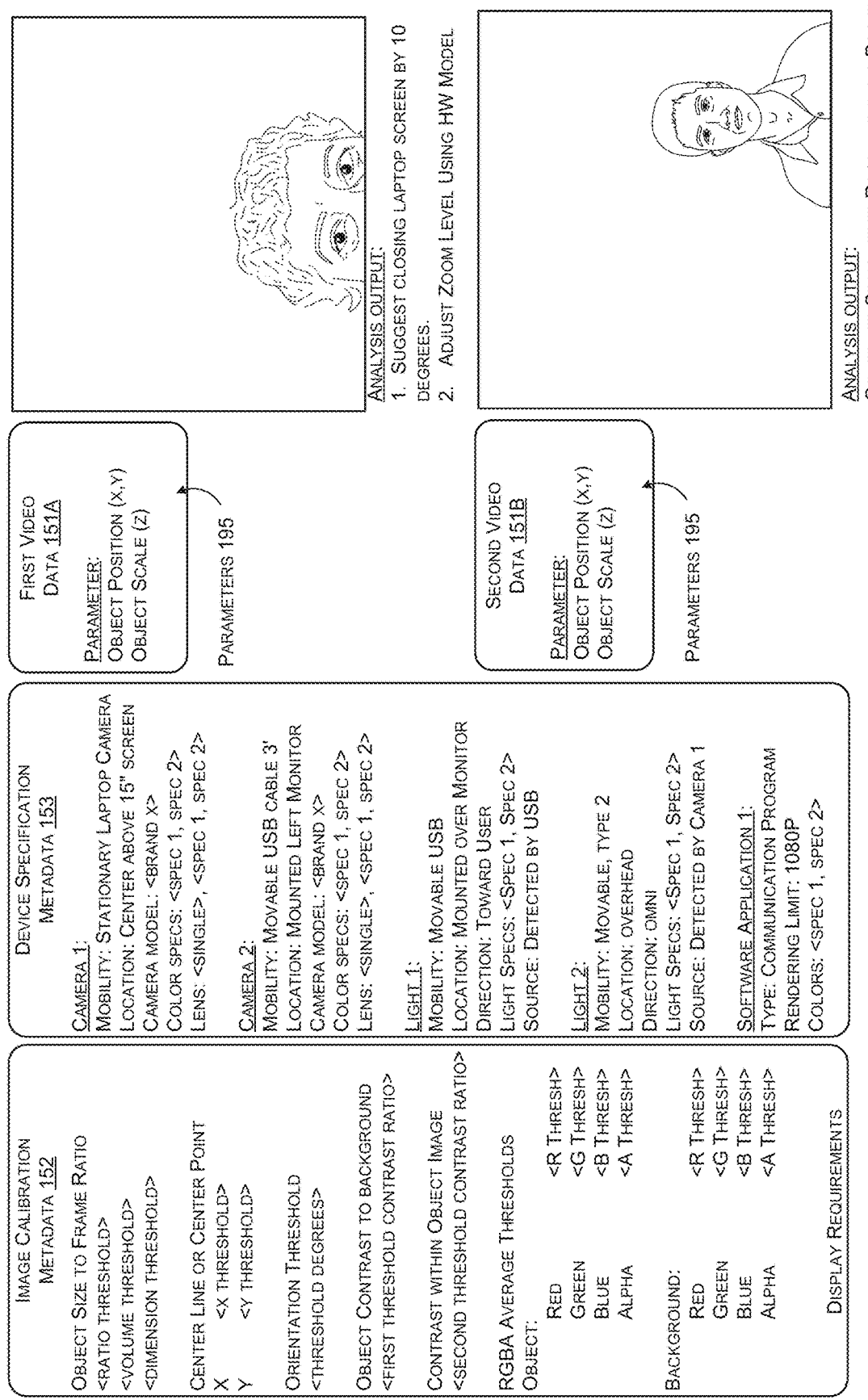
FIG. 2A shows examples of renderings having positional anomalies that can be adjusted using of image calibration metadata and device specification metadata.

Turning now to FIG. 2A, aspects of the calibration metadata 152 and the device specification metadata 153 are shown and described below. In general, the calibration metadata 152, e.g., the display requirements, includes a set of thresholds for coordinating display characteristics of the video streams 151 generated by the computing devices 106. In some configurations, the calibration metadata 152 can define positional and lighting display characteristics. These characteristics can be used to define criteria including object size ratio thresholds, positional thresholds, color thresholds, brightness thresholds, contrast thresholds, or any other criteria related to a display property. When using the specification metadata 153, each client computer may analyze and communicate video data meeting one or more criteria to the server or other client computers. In addition, when using the specification metadata 153, each client computer may also automatically adjust video data that meets or does not meet criteria.

One illustrative example of criteria defined by the calibration metadata 152 may include a volumetric measurement, where an object occupies a predetermined percent of area of a video frame. In one illustrative example of a volumetric parameter, a computing device may detect the presence of a visual anomaly if an object, such as a person's face, does not occupy at least a predetermined percent, e.g., 70%, of a particular viewing area, such as a viewing frame, of a user interface. If this parameter is applied to the first image shown in FIG. 2A, the upper right image, the system may determine that the image of the person does not occupy a threshold volume of the viewing area. Similarly, if this parameter is applied to the second image of FIG. 2A, the lower right image, the system may determine that the image of the person does not occupy a threshold volume of the viewing area. In response to determining the presence of such a visual anomaly, e.g., that the system determined that the image of the person does not occupy a threshold volume of the viewing area, or if the image of the person occupies more than a threshold volume, the system can invoke one or more actions to adjust the video stream. Additional details of the adjustments that may be made to video streams are described in more detail below.

Another illustrative example of criteria defined by the calibration metadata 152 includes geometric measurements, where an object that has at least one dimension that meets one or more criteria invokes one or more adjustment processes described herein. In one illustrative example of a geometric parameter, a computing device may detect the presence of a visual anomaly if a dimension of an object, such as the height or width of a person's face, is within, or greater than, a predetermined dimension or a predetermined percentage or ratio of the height or width of a particular area, such as a viewing frame of a user interface.

If this type of parameter is applied to the first image, the upper right image, the system may determine that the height of the image of the person's face is not within a predetermined percentage of the height of the viewing frame. Similarly, if this type of parameter is applied to the second image, the lower right image, the system may determine that the height and/or width of the image of the person's face is not within a predetermined percentage of the height and/or width of the viewing frame. In response to determining that the height and/or width of the image of the person's face is not within a predetermined percentage of the height and/or width of the viewing frame, the system may invoke one or more actions to adjust the source of the video stream. Additional details of the adjustments that may be made to video streams are described in more detail below.

Another illustrative example of one or more thresholds or criteria defined by the calibration metadata 152 may include location measurements, where an object that has a location that meets one or more criteria invokes one or more adjustment processes described herein. In one illustrative example, a particular point within an object, such as a center point of an object rendering, e.g., a center of mass, may meet one or more criteria when that point is more than, or less than, a predetermined distance from a particular coordinate, such as a center point, within a viewing area. For example, a computing device may detect a visual anomaly if an object, such as one of the person's eyes, is within a predetermined distance of a particular coordinate, such as the centerline or the center point of a viewing frame of a user interface.

If this type of parameter is applied to the first image of FIG. 2A, the upper right image, the system may determine that the top of the user's head is not within a predetermined distance to, or vertically or horizontally aligned with, the center point of the viewing area. Similarly, if this type of parameter is applied to the second image, the lower right image, the system may determine that the center point of the user is not within a predetermined distance to, or vertically aligned with, the center point of the viewing area. In response to determining that a point, e.g., a predetermined area, facial feature, or pixel, within the object is within a predetermined distance, or outside of a predetermined distance, from a particular coordinate within the viewing area, the system may invoke one or more actions to adjust the source of the video stream. In another example, in response to determining that a point within the object is not vertically aligned with a particular coordinate within the viewing area, the system may determine an anomaly is detected and invoke one or more actions to adjust the source of the video stream. As shown, the positional anomalies may be reflected in the video data 151A and 151B having parameters 195, such as positions (x, y) and a scale (z) for an object. Such metadata can be generated by the use of a sensor such as a camera or a LiDAR device.

In the example of the first image of FIG. 2A, once an anomaly is detected, the client may suggest that a user make an adjustment to a camera or automatically adjust the camera, e.g., modify a zoom level. As described herein, different types of adjustments may be selected based on priorities determined for each adjustment, which may be based on the device specification metadata and other detected factors. In this example, consider a scenario where the computer detected that a point of the object is more than a threshold distance from a center point of the viewing area, e.g., the viewing frame for the rendering. In such a scenario, the client may suggest that a user make an adjustment by closing a laptop lid by a predetermined amount. The system may even calculate a value of the adjustment using measurements detected by a sensor and generate an instruction, e.g., close the laptop by 10 degrees. The client computer may also perform an alternative adjustment in the event that the user declines the first recommendation or that the first recommendation does not address the anomaly. In this example, an alternative adjustment may include an adjustment to the zoom level to a camera. This adjustment made be based on a distance measured by the camera, e.g., distance between a location of a rendered object and a center point of a display area, and/or a model number of the camera.

As described herein, the recommendations may also be ranked based on a number of factors. Given that some types of adjustments may require less computing resources than applying a software-based adjustment to the video data, instruction-based adjustments to a camera position and a camera zoom level may rank higher than an adjustment that requires an ongoing adjustment of video data.

The adjustments and the adjustment rankings may be based on the device specification metadata. In the example of the second image, once an anomaly is detected, the client may generate a silhouette to show a desired position for a user, or the computer may adjust a zoom level and implement a crop function to the adjusted image. Such adjustments can be ranked higher than software-based adjustments such as a software-based cropping of an image. Other details of the adjustments that may be made to video streams are described in more detail below.

Another illustrative example of criteria defined by the calibration metadata 152 may include rotational parameters, where a rotational orientation of an object that meets one or more criteria can invoke one or more adjustment processes described herein. This embodiment can analyze images to determine if a person's head is tilting beyond the threshold level or if a camera is capturing an improper orientation.

In one illustrative example, a rotational angle of an object, such as a person's head, may meet one or more criteria when that the rotational angle of that object is more than, or less than, a rotational threshold relative to a predetermined angle. For example, a client computer may detect the presence of a visual anomaly if an object, such as a person's head, is tilting more than 35 degrees to the left of a predetermined vector, e.g., a vertical line. In any of the examples disclosed herein, any detected visual anomaly can cause a client computer to invoke an adjustment to a video stream that meets or does not meet one or more criteria. Additional details of the adjustments that may be made to video streams are described in more detail below.

FIG. 2A also shows an example of device specification metadata 153. In general, the device specification metadata 153 can include information that describes the capabilities of an individual client computer. For instance, the device is metadata 153 can describe a number of cameras, camera types, lighting arrangements, specifications for individual cameras and lights. With respect to the cameras, the device specification metadata 153 can describe if a camera has LiDAR capabilities, aperture parameters, zoom capabilities, lens specifications, and special effects capabilities, sensitivity levels, filters, etc. As described in more detail below, once a client computer detects an anomaly, different types of adjustments to video data can be selected or ordered based on the device specification metadata 153.

The device specification metadata 153 can also indicate a level of mobility and a location of a device such as a camera or light. For instance, if a camera is attached to a laptop, a level of mobility may be at first value since the camera can be rotated with the lid of the laptop, but not able to move laterally or vertically. If a camera is attached via a USB cable, the level of mobility may be at a second value since the camera can move laterally, vertically and be rotated. A light may also be associated with a level of mobility based on similar physical characteristics.

As described herein, the level of mobility can be used to determine a type of adjustment that is selected for a particular video stream. For instance, with respect to the example of a first level of mobility for a light, if a light is creating an even exposure to an object, e.g., the light is too bright on one side of a person's face, if the level mobility is at the system may recommend that the person move the light. But if the light is not associated with a threshold mobility level, the system may automatically dim the light. Similarly, if the level mobility of a camera is at a first level, e.g., the camera cannot be moved, the system may analyze the lens specifications and automatically zoom the camera out to a new angle if the camera cannot be moved. However, if the camera can be moved, as indicated by a level of mobility, the system may first generate and display a recommendation for the user to move the camera. Then, if the camera movement does not correct visual anomaly, a second action, such as a zoom adjustment may be recommended or automatically invoked. Thus, once an anomaly is detected, different types of adjustments can be selected or ordered based on the device specification metadata 153.

The device specification metadata 153 can also describe properties regarding the lighting within an environment surrounding a client computer. For example, the device specification metadata 153 can describe a number of lights that are connected to a computing device and indicate the parameters of each light. Such data can include an intensity level, a focus level, a location of a light, a mobility level, and a direction of a particular light. Some of the parameters of each light source can be provided by a model number or a description of a product. This may include an intensity level, a focus level, and directional properties. In one specific example, the parameters indicate that a light source is 100 Watts and has a 180 degree reflective surface that directs light to a predetermined direction and has a focal distance of 5 feet. The parameters can also include a location of the light relative to a person or a computer. This can include coordinates of the light relative to an object or the description can be more general, e.g., a light is positioned between the computer and a user, or a light is positioned on top of the computer and directed towards a user.

Once an anomaly is detected, different types of adjustments can be selected or ordered based on the device specification metadata 153. For example, if a light is rated to be at 100 Watts and it is not mobile, the system may determine that a user can increase the light to the maximum brightness if video data indicates that an image is too dim, below a lighting threshold. However, if the light is not mobile and the light is already at its maximum setting, the system may instruct the user to move closer to the light. In another example where a light is movable, if a light level in an image of video data is too low and the location data indicates that the light is beyond a threshold distance to an object, the computing device may display a recommendation for the user to move the light to reduce the distance between the light and the object. Thus, these parameters of the light or another device can be utilized to determine whether a computer can instruct the user to make an adjustment or whether the computer is to invoke an automatic adjustment.

The parameters of the device specification metadata 153 can also be determined by a client computer. For instance, if a camera detects light intensity levels and light patterns within an image, the computing device can configure the device specification metadata to indicate a location and direction of a light. For instance, the computer can modify the device specification metadata 153 to indicate that a light is five feet from an object and directed toward that object. In addition, the client computing device can calculate a projection of how far the light is away from the object. If the light is directed to an object the client computing device can measure the intensity and parameters of a light pattern. For instance, if the light is directed to a wall and creates a light circle of 6 feet, the client computing device can generate data indicating a level of focus and a distance of a light source. Such embodiments can use other camera specification information such as lens specifications for directing light, bulb type, etc.

In another example, if a light source is directed towards a person and that light source only reflects from the right side of that person's face, the client computing device can determine a position of that light source and generate device specification metadata indicating that position and the level of intensity. The level of intensity and/or a contrast level can also be measured by a comparison between two portions of an object. For instance, in the scenario where a light source reflects from the right side of a person's face, the client computing device can determine an intensity from both sides of the user's face. The determination of the location of the light can also be based on a model number and/or other specifications, e.g., a power rating of a light. For example, a power rating of 100 Watts for a light combined with a measured contrast level can be used to determine the location of a light. The location of the light or any other parameter of the device specification metadata 153 can be used by the client computer to determine a type or an order of several adjustments. For instance, if a light is determined to be located between a user and a computer, and the image is too bright, the system may generate and display a recommendation for the user to move the light behind the computer.

Any adjustment disclosed herein can be automatically performed by the computing device, such as an adjustment of a contrast level or a brightness level. Any adjustment disclosed herein can also cause the display of a notification with a suggestion to correct an anomaly. For instance, in continuing the example where the light is reflecting from one side of a person's face, If the contrast level between two portions of the person's image exceeds a threshold defined in the calibration metadata 152, the system can automatically adjust the brightness level or adjust other display properties for that image to compensate for the detected anomaly. In addition, or alternatively, if the contrast level between two portions of the person's image exceeds a threshold, the system can generate a notification instructing the user to for instance, in this scenario, based on a finding that a light level is too bright on the right side of the person's face, the system may provide an instruction for a user to move the light to a center position, turn the light down or cover the light. The two types of adjustments can be ranked and presented to a user based on one or more factors. For instance, a more computationally efficient adjustment, such as the notification with a suggestion may be ranked higher than the solution involving a software or algorithmic adjustment to a brightness level of an image.

In some configurations, when the server receives device specification metadata 153 from individual client computers, the server can determine how to configure the calibration data 152. In one example, different types of adjustments can be prioritized based on the device specification metadata 153. For instance, in the above example where a light level exceeds a threshold on one side of a person's face, e.g., the right side of a person's face, the system may generate a notification instructing the user to move the camera to the right side of the person's face. This instruction may also be based on the camera type and/or a light type. For instance, if a camera is a Microsoft 720P USB camera, the instruction may be generated to move the camera. However, if the camera is a laptop camera built into the screen, the system will lower the priority of any instruction of moving the camera and raise the priority of any instruction of moving the light.

Figure 2B:
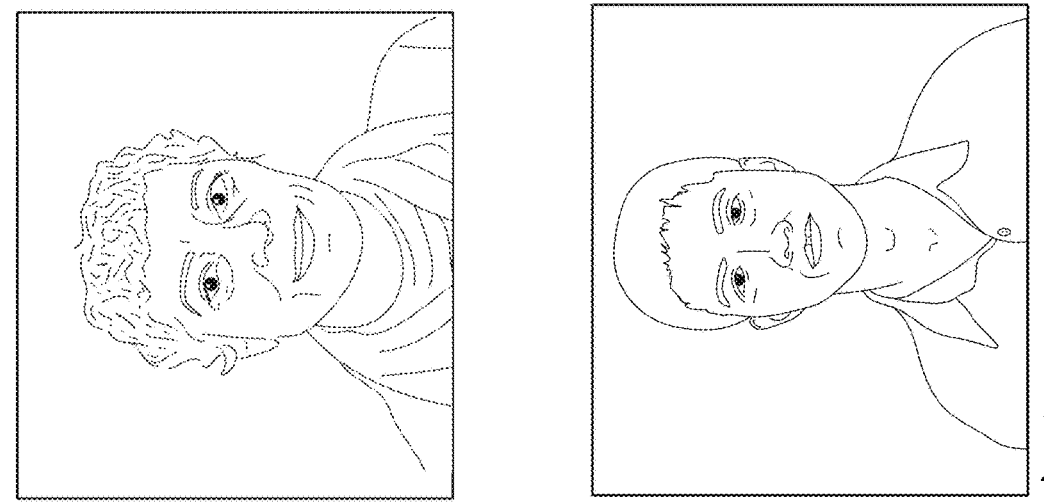
FIG. 2B shows examples of renderings that were adjusted to remove positional anomalies using of image calibration metadata and device specification metadata.
Figure 2B:
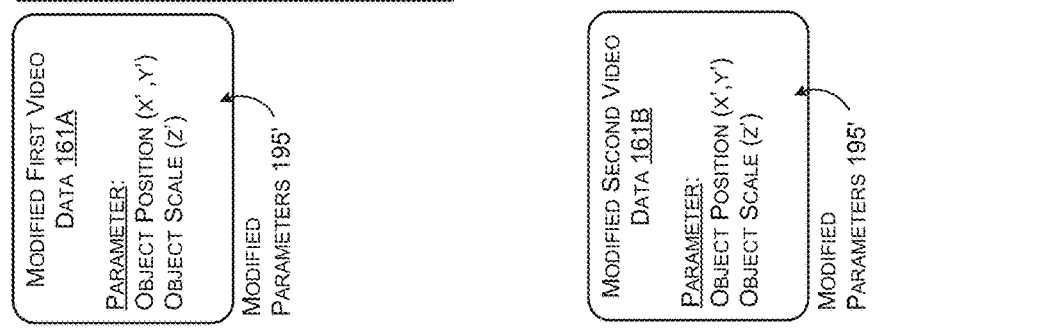
Figure 2B:
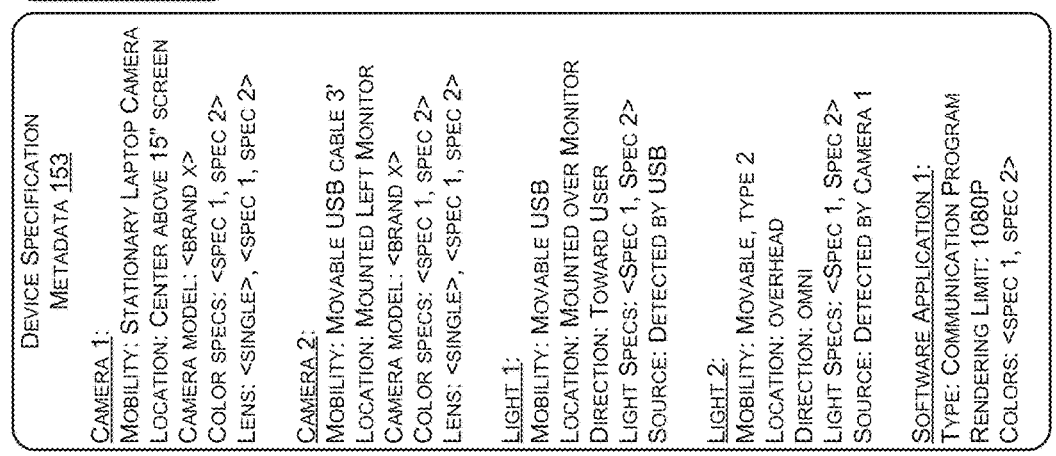
Figure 2B:
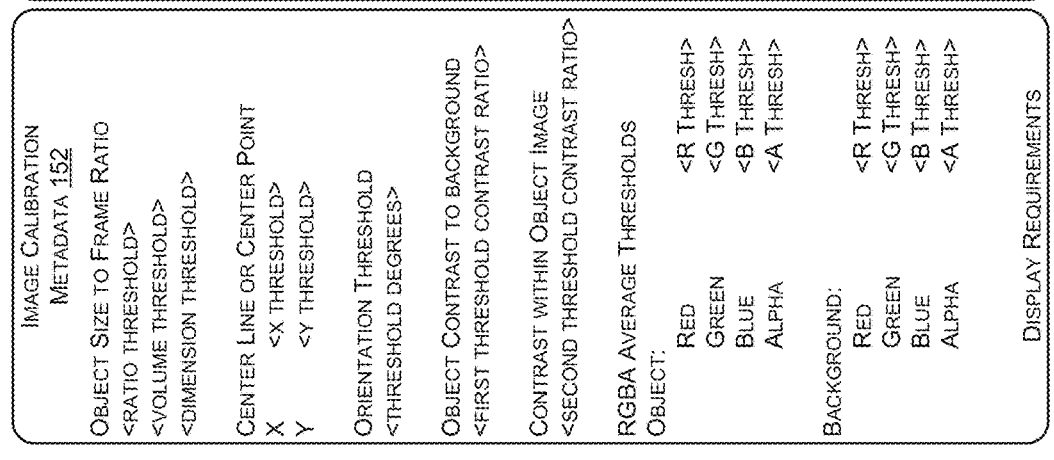

FIG. 2B shows examples of renderings after the adjustments to the renderings are made. As shown, the positional anomalies are corrected using the image calibration metadata and device specification metadata. The system may generate modified video data 161A and 161B having updated parameters 195', such updated positions (x', y') or updated scale (z').

Figure 2C:
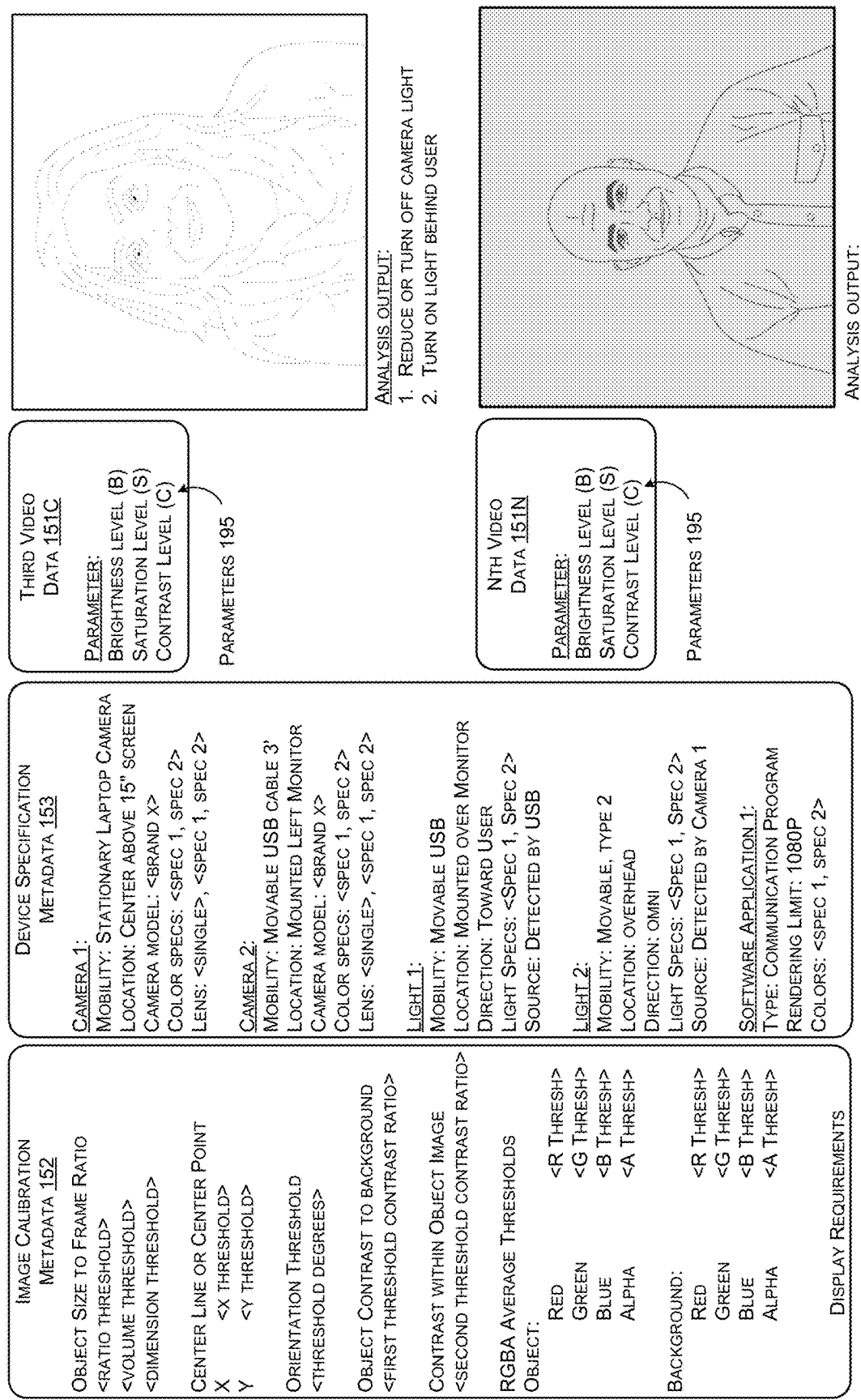
FIG. 2C shows examples of renderings having light level anomalies that can be adjusted using of image calibration metadata and device specification metadata.

As shown in FIG. 2C, the image calibration metadata 152 can also include a number of resolution, lighting and color parameters. For instance, the image calibration metadata 152 can indicate thresholds for certain colors, e.g., using an RBG scale, and other thresholds, such as an Alpha value. The thresholds can be specific for a background or an object. In addition, the calibration metadata 152 can also define thresholds for multiple types of contrast levels. This allows more granular levels of measurements for each client. These parameters can define thresholds and ranges that can be utilized by client computing devices uniformly measure and evaluate data. This information allows each client computing device to measure video data using a coordinated standard so that each computer does not determine, for instance, using a unique variation of what is determined to be an unacceptable contrast level, brightness level, contrast level, etc. Thus, if a client computing device detects that any parameter, e.g., a resolution level, contrast level, brightness level, or contrast level, of the video data 151 exceeds a threshold, or is not within a predetermined range, that client computing device detects the presence of lighting or color anomalies and can invoke one or more adjustments. As shown, the lighting and color anomalies may be reflected in the video data 151A and 151B having parameters 195, such as brightness levels (B), saturation levels (S), contrast levels (C) that do not meet criteria, e.g., above or below a threshold. In other examples, a system can change a resolution of one or more streams to coordinate the streams from each client computer. This way if one device comes in at a lower resolution, a non-HD stream, and other devices have 4K, the system can set thresholds so each device coordinates.

The image calibration metadata 152 can define contrast thresholds for various aspects of an image. For instance, a first contrast threshold can measure a contrast between an object and a background of an image. A contrast level can be measured with respect to an average brightness level of an object versus an average level of brightness of the background. The contrast can also compare a brightness level of selected portions of an object, such as an area around a person's eyes, and compare that brightness level to a brightness level of a specific part of a background. In another example, a contrast level can be measured with respect to an average brightness level of one part of a person's face versus an average level of brightness of another part of the person's face. This can include portions such as a top half versus a bottom half or a portion around a person's eyes versus a portion around a person's nose. Thus, if a client computing device detects that any one of these contrast levels exceeds a threshold or is not within a predetermined range, that client computing device can invoke one or more adjustments to a locally generated video stream. Such examples allow each computing device to use the same parameters for comparing contrast levels so that when the streams are compiled into a common user interface, each rendering has a similar style and appearance.

In some configurations, the system can configure the image calibration metadata 152 that causes a client computer to select an area of an image based on a detected scenario. For example, if the system determines that a number of users are wearing the same uniform, the system may select a part of the uniform for measuring light levels. This allows contextual analysis that can be applied to all of the client computing devices uniformly. In this embodiment, a server may perform some functions, e.g., determine if people are wearing uniforms or determine if people are wearing common color themes. In this scenario, the server may perform a limited number of functions to make a determination but then generate the calibration metadata 152 to allow each client computing device to make the adjustments to the video data.

One illustrative example of criteria defined by the calibration metadata 152 may include light level thresholds, where light levels of an object, a light level of a background, or a contrast level between two portions of an image. A detection of any light level meeting or not meeting criteria can cause a client computing device to make the adjustments to the video data. If such parameters are applied to the first image shown in FIG. 2C, the upper right image, the system may determine that contrast levels or brightness levels of the image do not meet one or more criteria, e.g., that an image is too bright, or a particular color of an image is too bright, or that the image does not have a threshold contrast level. Similarly, if this parameter is applied to the second image of FIG. 2C, the lower right image, the system may determine that the image of the person is not bright enough or does not have a contrast level that meets one or more criteria. Threshold can be established for any combination of colors as well. Thus, an image having one or more colors having a level that is higher or lower than a threshold, which could be a range, can cause the system to invoke one or more adjustments.

In the example of the first image of FIG. 2C, once an anomaly is detected, the client may generate a recommendation suggesting that a user reduce a light level, turn on, or a light or turn a light off depending on a location of a light and a location of a camera relative to an object. In the example of the second image, once an anomaly is detected, the client may generate a recommendation suggesting that a user reduce a light level, turn on, or a light or turn a light off depending on a location of a light and a location of a camera relative to an object. In either example, when the client computer determines that a recommendation is ineffective within a certain period of time, the client computing device can implement a computer-controlled adjustment to modify a light level with an image locally. By recommending user adjustments prior to implementing computer-controlled adjustments, computing resources may be used more efficiently by reducing the number of occurrences where computer-controlled adjustments are needed.

Figure 2D:
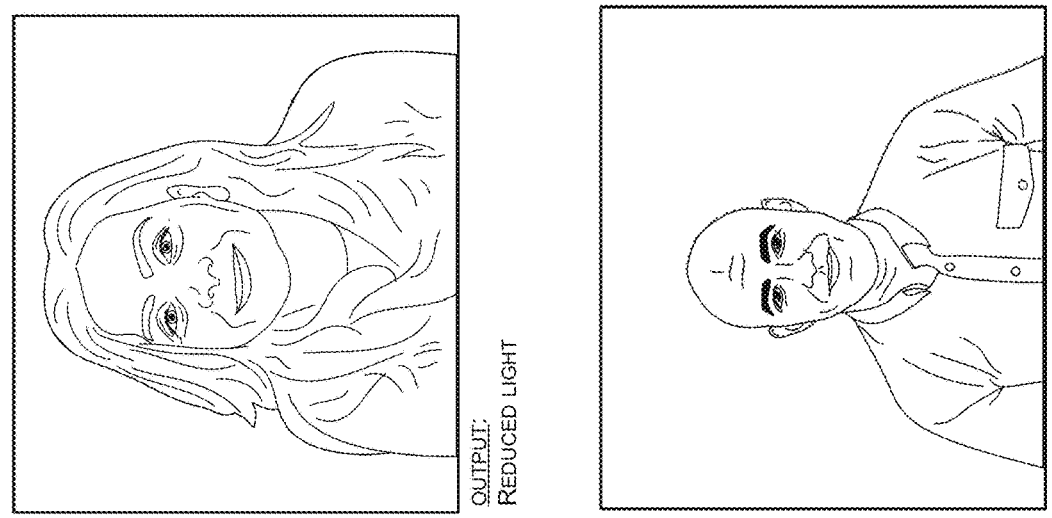
FIG. 2D shows examples of renderings that were adjusted to remove light level anomalies using of image calibration metadata and device specification metadata.

FIG. 2D shows examples of renderings after the adjustments to the renderings are made. As shown, the lighting and color anomalies are corrected using the image calibration metadata and device specification metadata. The system may also generate modified video data 161A and 161B having updated parameters 195', such updated brightness levels (B'), saturation levels (S'), contrast levels (C').

Figure 3A:
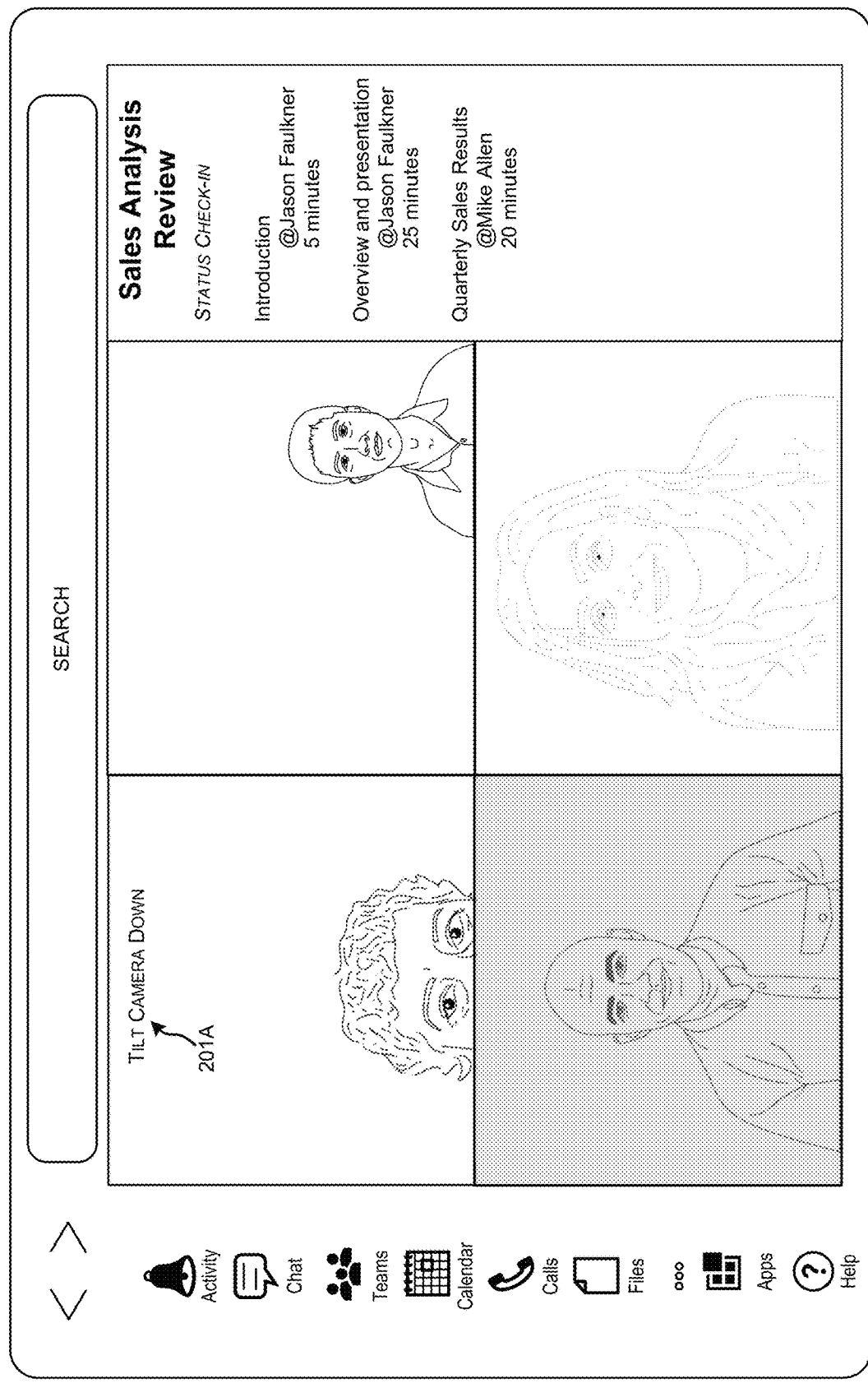
FIG. 3A shows a first user interface displaying a text-based recommendation for correcting a positional anomaly of a video stream.

FIG. 3A illustrates an example user interface 101A that may be displayed to a first user associated with a first computing device 106A. This example involves the display of a graphical element 201A of a recommendation generated by the first computing device. In this case, although multiple recommendations may be prioritized, this example shows an instruction for a user to make a manual adjustment. By having a user first make a manual adjustment before invoking an automatic, computer-controlled adjustment, the system can preserve computing resources at the first client computer. Once the recommendation to display do user, the system may continually monitor the video data to determine if the anomaly was corrected. If the anomaly is not corrected within a predetermined period of time, the system may implement alternative adjustments, such as an adjustment of a zoom level of a camera. The order of the adjustments can be based on priorities determined by thresholds that are defined in the calibration metadata that is shared amongst a number of client computers for coordinating display characteristics between the computing devices. As shown in this example, recommendations can be ordered based on criteria defined in the calibration metadata. The display order can be based on a priority of each recommendation and as described herein, the priority can be based on a level of mobility of a device and device characteristics.

Figure 3B:
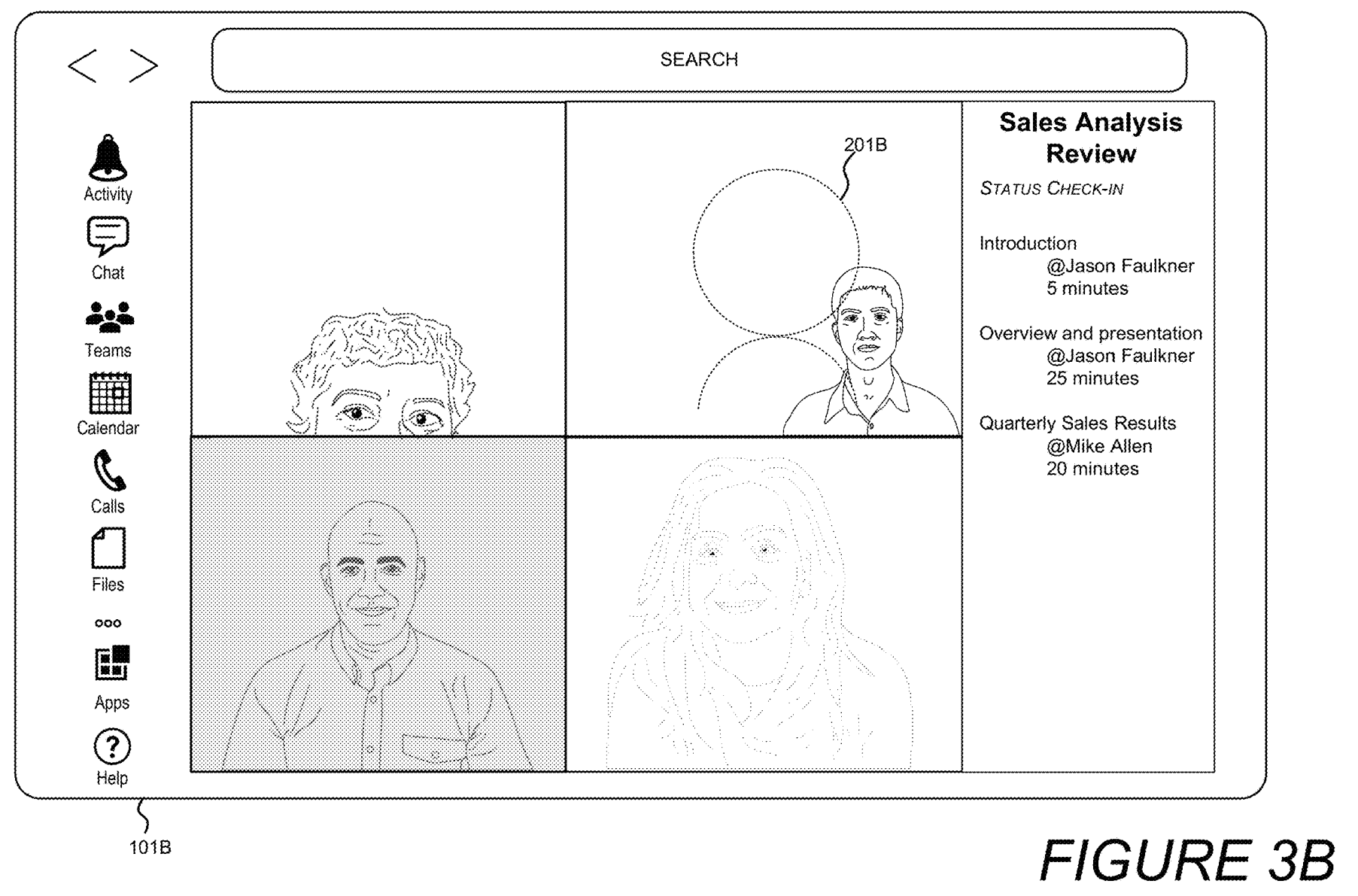

FIG. 3B illustrates an example user interface 101B that may be displayed to a second user associated with a second computing device 106B. This example involves the display of a graphical element 201B of a recommendation generated by the second computing device. In this case, although multiple recommendations may be prioritized, this example shows an instruction for a user to make a manual adjustment before a software-based adjustment is invoked. By having a user first make a manual adjustment before invoking an automatic, computer-controlled adjustment, the system can preserve computing resources at the first client computer. In this example, the graphical element 201B may be in the form of a silhouette that directs the user to a certain position. This may allow the client to resolve the anomaly without requiring further use of computing resources to adjust the video data.

Figure 3C:
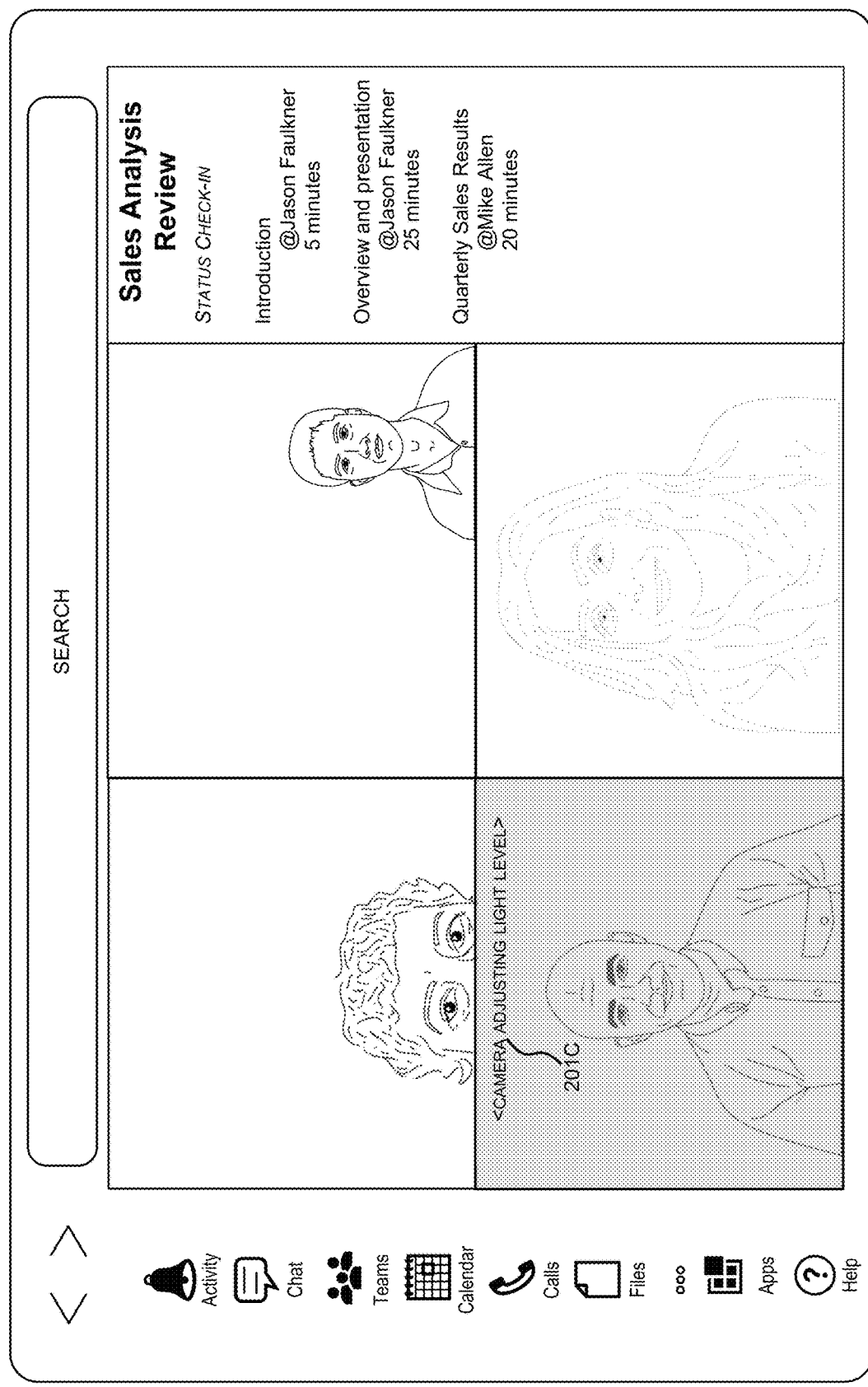
FIG. 3C shows a third user interface displaying an indicator showing a status of a client that is correcting a light level anomaly of a video stream.

FIG. 3C illustrates an example user interface 101C that may be displayed to a third user associated with a third computing device 106C. This example involves the display of a graphical element 201C of a status of an adjustment. In this example, consider a scenario where the client computer did not detect controllable lights within the user's environment and also detected a lowlight level. In this example, given the anomaly, the computing device determines that an adjustment may be made to a sensitivity level of the camera prior to adjusting the video data. In such a scenario, the computing device may display a graphical element to indicate that the adjustment is being made.

Figure 3D:
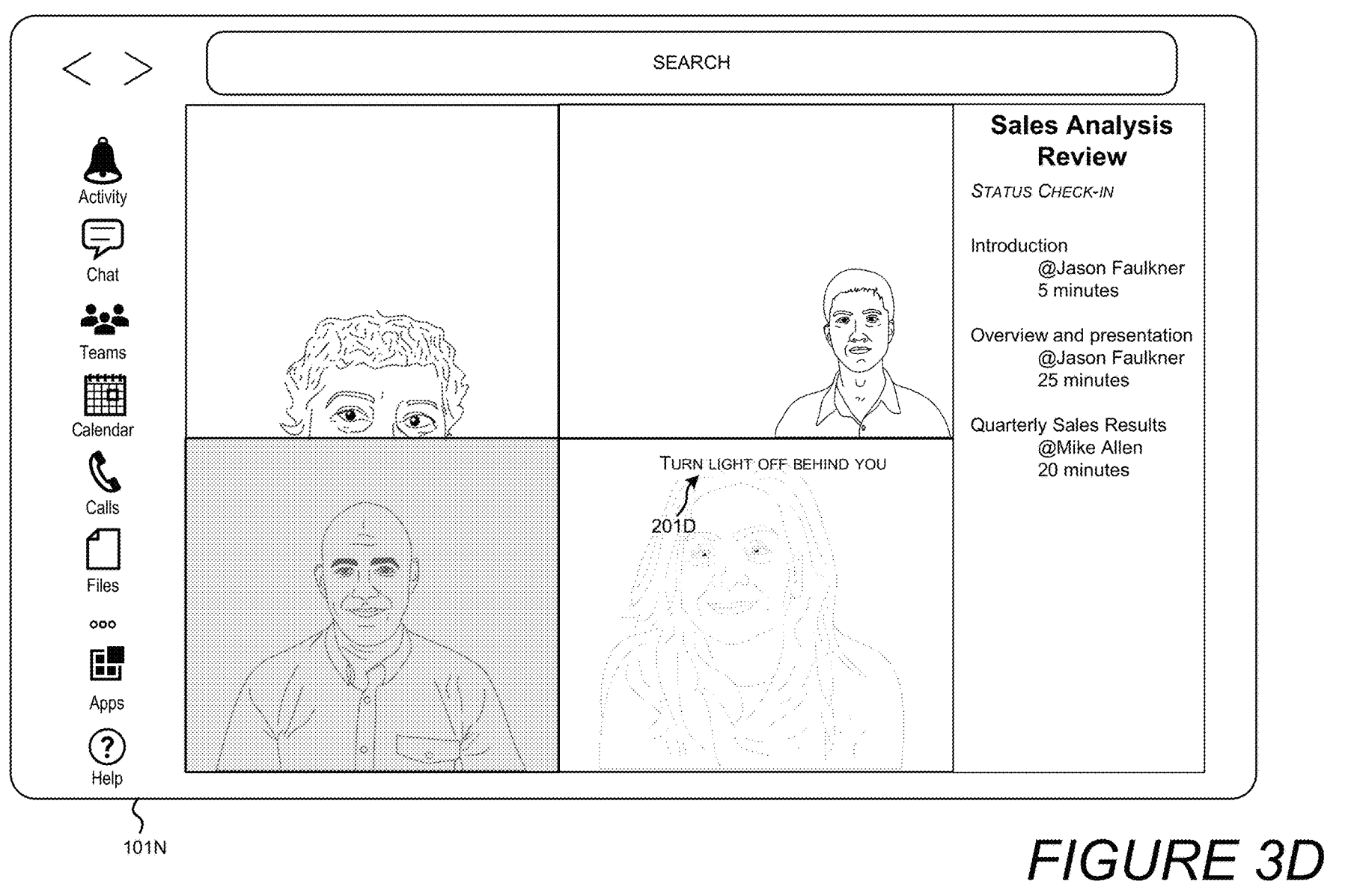

FIG. 3D illustrates an example user interface 101N that may be displayed to another user associated with a Nth computing device 106N. This example involves the display of a graphical element 201D of a recommendation generated by the computing device. In this case, although multiple recommendations may be prioritized, including software adjustments to a video stream having the anomaly, this example shows an instruction for a user to make a manual adjustment before a software-based adjustment is invoked. By having a user first make a manual adjustment before invoking an automatic, computer-controlled adjustment, the system can preserve computing resources at the first client computer. In this example, the graphical element 201D may be in the form of an instruction for a user to make automatic adjustments to a light, e.g., turn a light down. In this case, the system may prioritize this adjustment over other adjustments based on the fact that a light is detected within the environment and position behind the user causing the anomaly.

Figure 3E:
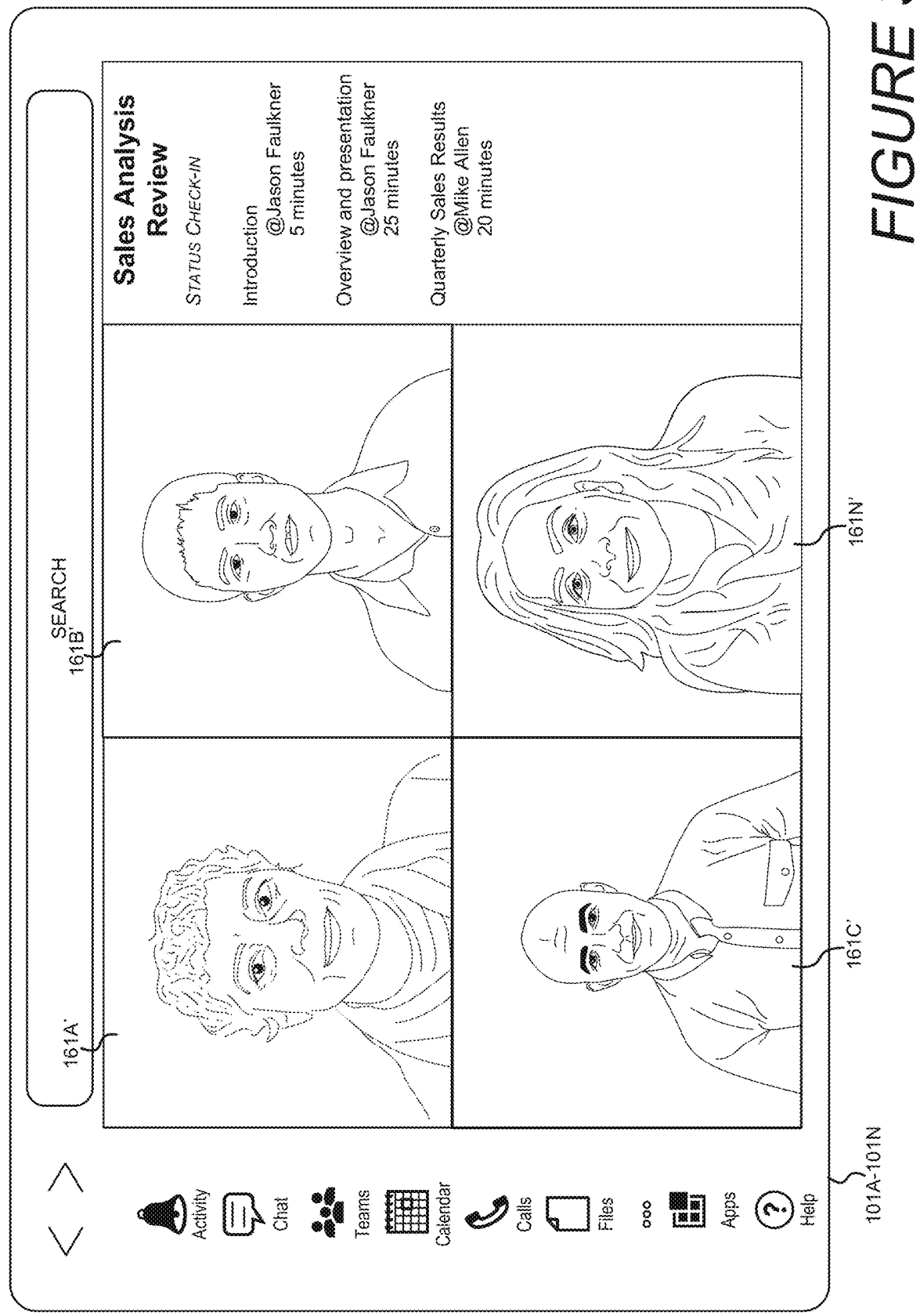
FIG. 3E shows an example user interface displaying a composition of video stream renderings that are each adjusted by the client devices utilizing the image calibration metadata.

FIG. 3E shows an example of the user interfaces of a communication session after the adjustments have been executed. As shown, the renderings, such as the first rendering 161A', second rendering 161B', third rendering 161C and the Nth rendering 161N, show more consistent perspectives of each user and more consistent lighting results based on the calibration metadata shared between the computing devices.

These examples are provided for illustrative purposes and are not to be construed as limiting. It can be appreciated that in addition to, or alternatively, the renderings can involve a range of perspectives of a person or an object. For example, a rendering may comprise an object such as an electronic whiteboard that is positioned near a user, a scenario that may involve a scene where one user having a particular role is on the stage with a presentation of content. This arrangement may also have a camera angle that shows a full view of a person standing next to a large screen displaying content. Thus, although aspects of the present disclosure involve coordination between computing devices create more consistency between each rendering, some renderings, based on a particular role of a user may have different display settings and parameters based on the assigned rules. In one illustrative example, each user having audience roles may have a particular set of parameters for their video data, e.g., video data requiring that each person's face take 60% of the viewing area, and each user having presenter roles may have another set of parameters for their video data, e.g., video data requiring that each person's full body and face take 80% of the height of the viewing area. Thus, uniformity between the renderings can be based on roles.

In addition, the techniques disclosed herein can apply to visual augmentations of objects. For instance, a user may be presented as an avatar that is configured with animated motion based on a user's real-world gestures. In such an embodiment, the same parameters for the analysis of the video data can be analyzed for the avatar in a similar manner to the analysis of the other objects described herein. Thus, if an avatar has a threshold height, width and/or volume the system may cause an adjustment to be executed on one or more client devices. The adjustment may involve a correction to zoom level for a real-world object, such as a person having their image captured by camera. In another embodiment, or as a primary or an alternative adjustment, the system may render a silhouette for guiding a person to move their position within a viewing area. Such adjustments can cause a system to generate an adjusted perspective of a rendered avatar similar to the solutions represented in FIG. 3E.

Figure 4A:
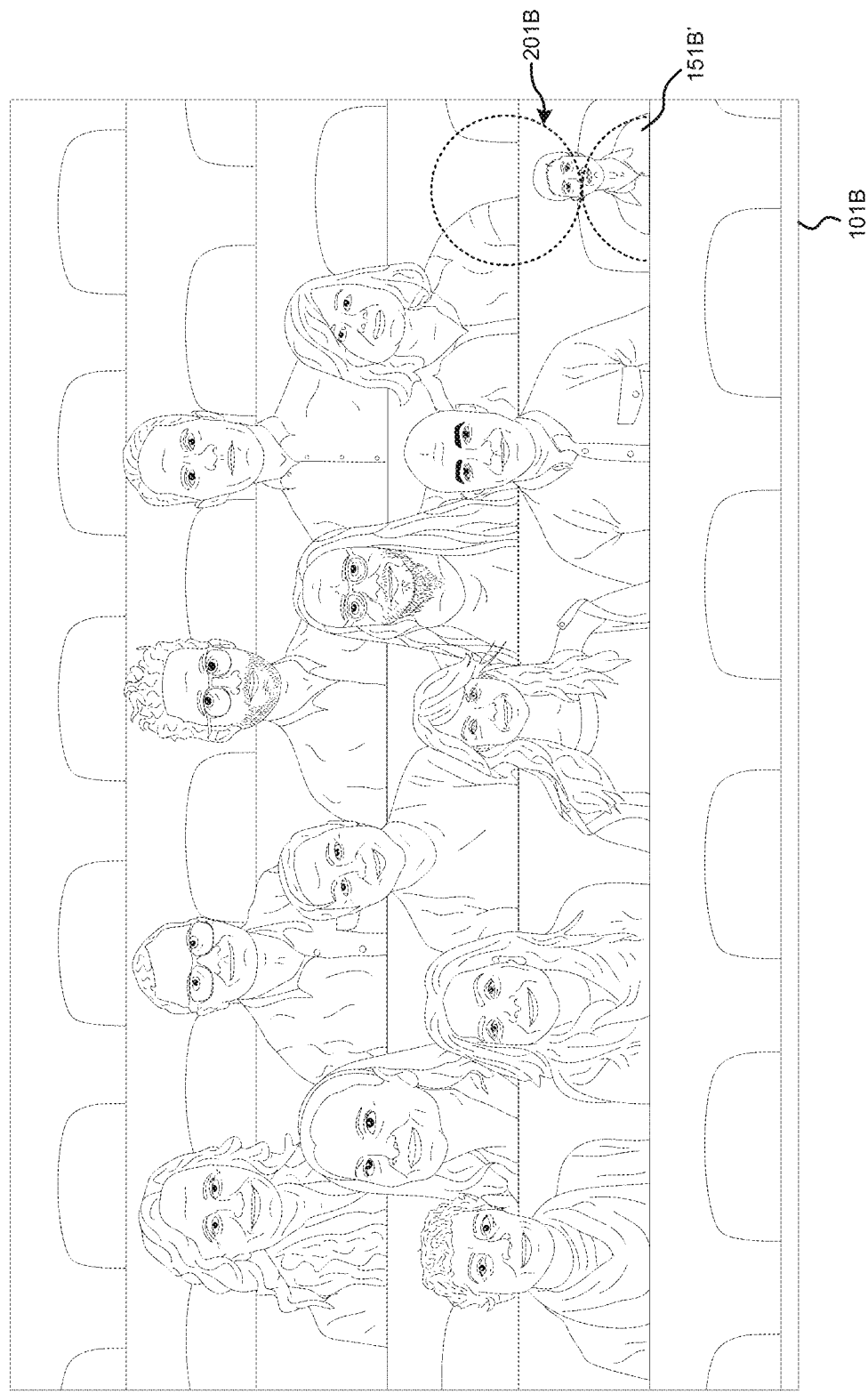
FIG. 4A shows an example of a Together Mode user interface comprising a graphically based recommendation for correcting a positional anomaly of a video stream.
Figure 4B:
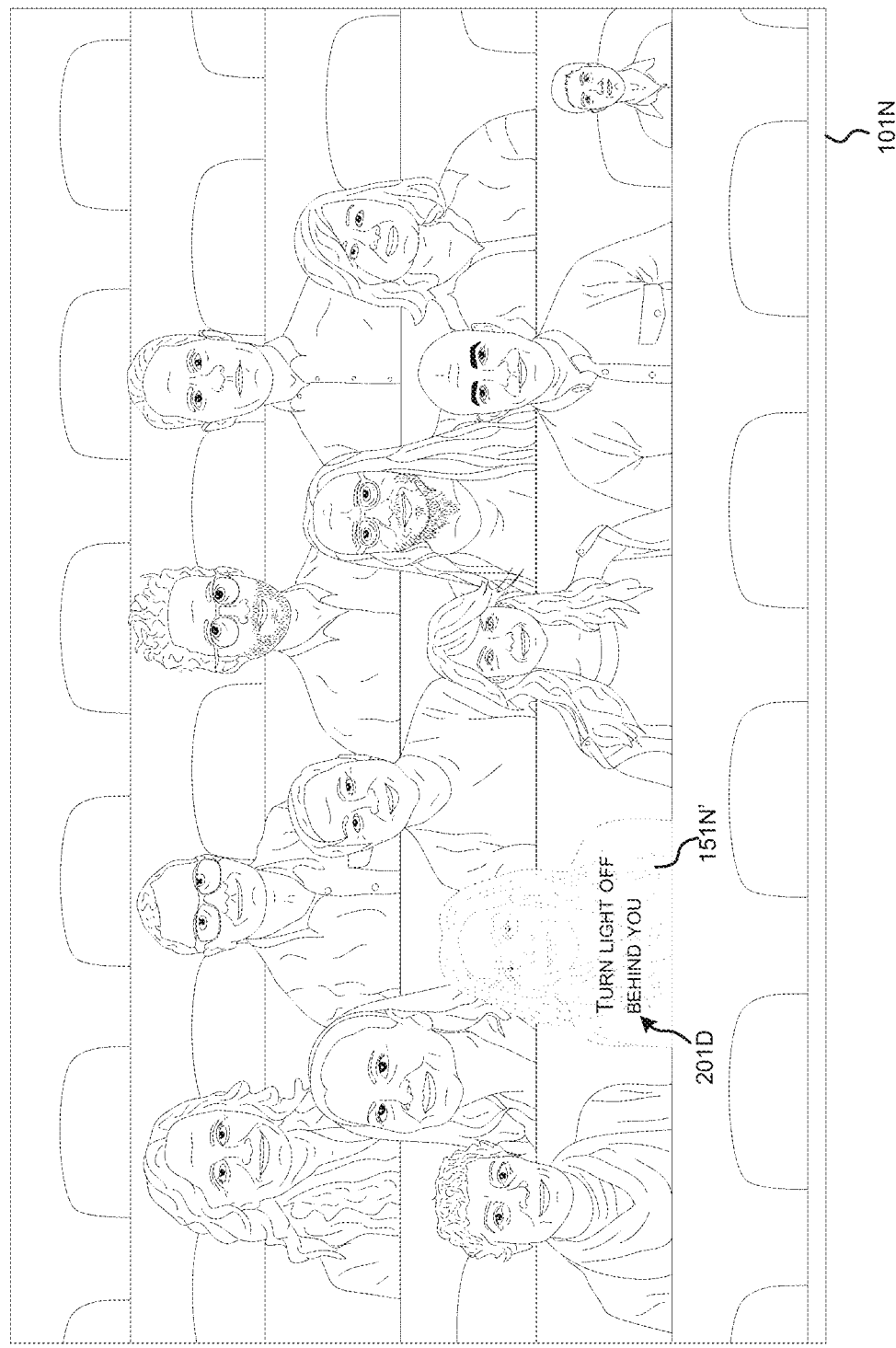
FIG. 4B shows an example of a Together Mode user interface comprising a recommendation instructing a user to make an adjustment to make local environmental modifications.
Figure 4C:
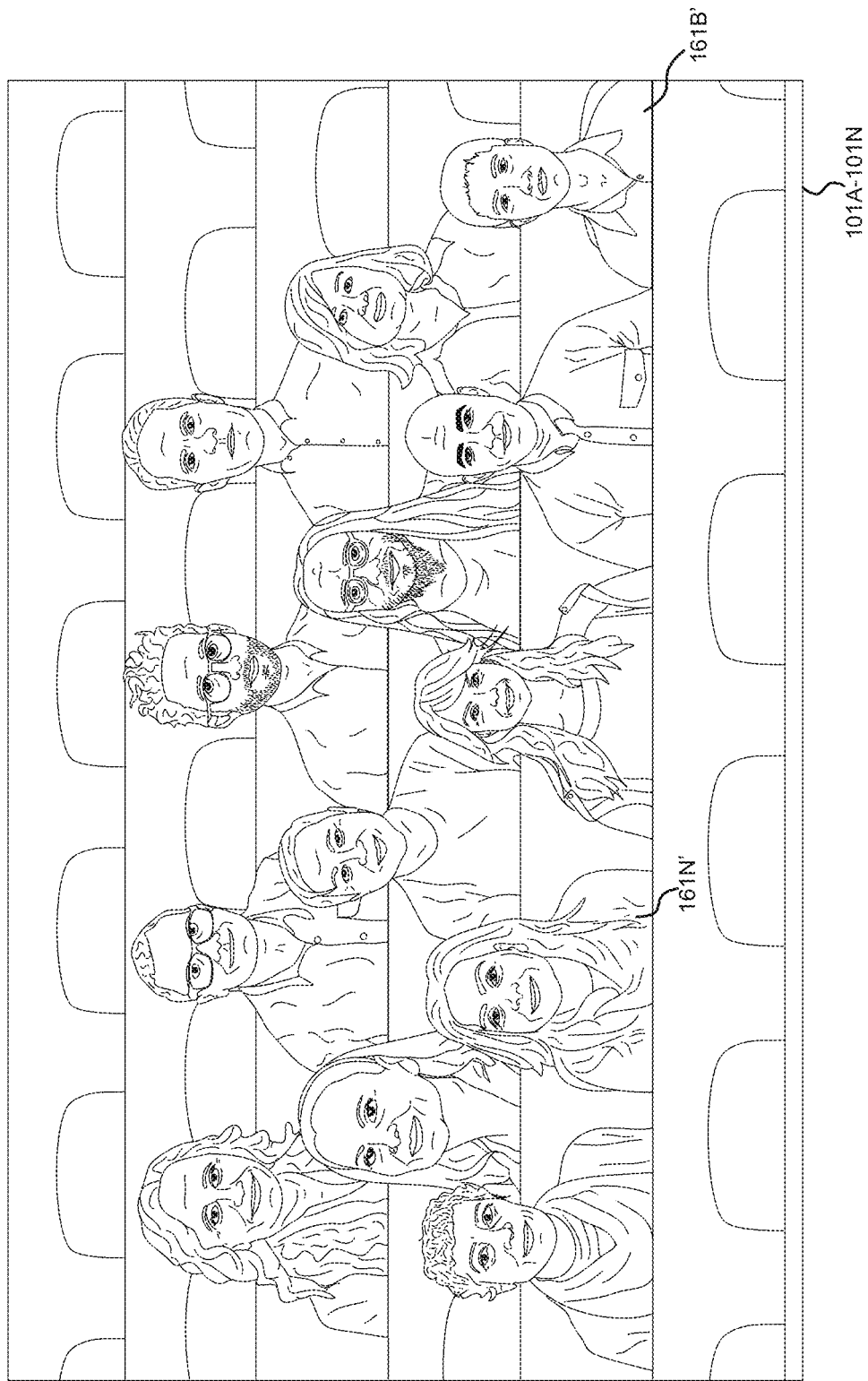
FIG. 4C shows an example of a Together Mode user interface displaying a composition of video stream renderings that are each adjusted by the client devices utilizing the image calibration metadata.

Referring now to FIGS. 4A-4C, other embodiments of the present disclosure involving a Together Mode user interface is shown and described below. The Together Mode user interface changes the whole user experience compared to the traditional box grid user interface arrangement. This is possible because people's brains are used to being aware of others based on their location, and the Together Mode UI is designed to manage the location of the users. The way in which people are positioned in the Together Mode UI can help make it easier for everyone to see non-verbal social cues and tell how they are responding to each other. The Together Mode UI enables participants to utilize social and spatial awareness mechanisms in the brain. This enables a participant's brain to function more naturally and provide a richer user experience that does not cause fatigue. When viewing a video conference through the Together Mode UI, users can practice some of the natural social signaling they would do in real life, e.g., social signaling that may occur during in-person meetings.

In another example of a technical effect of the present disclosure, the Together Mode UI enables users to maintain eye contact. This helps with a known issue with some existing grid-based video conferencing systems that have issues with gaze misalignment. While video conferencing systems have grown more robust and stable over the decades, there have been no real improvements to the user experience that were viable for widespread use. The grid format has fundamentally been the same over the years and such formats have been known to cause video-call fatigue. For example, if someone's face looms large in a person's visual sphere in real life, it generally causes a person to trigger a fight or flight response. In this state, that person is alert and hyper-aware, which causes amplified reactions that are automatic and subconscious, and that person's heart rate can be unnecessarily elevated. In video calls, there's often a grid with multiple faces filling the boxes, some that may be scaled at disproportionate sizes. In those traditional UI arrangements, that user experience can be overwhelming for a person's nervous system to handle.

The Together Mode UI can provide added context to user gestures that enables more effective communication by positioning renderings of individuals within a virtual environment and maintaining positions of renderings of each user. For example, when users know that they are positioned next to a person within a seating arrangement, head movements have actual meaning to each person. Gestures and subtle movements of each person have an in-person meeting feel and movements do not create the confusion that occurs in traditional grid format UI's. In some configurations, the Together Mode UI can involve a process for scaling the renderings of individuals to help give the appearance that everyone is the same room. These features can help a system cause less confusion and also help reduce fatigue. These benefits can help make a user's interaction with a computer more accurate and realistic, while providing more effective communication between users. These benefits can be achieved when the renderings are also consistent with respect to one or more display properties, e.g., size and brightness of each person. The Together Mode UI also enables users to readily locate individuals and interpret non-verbal social cues using natural cognitive brain functions. Having inconsistencies between each rendering can detract from the technical benefits of the Together Mode UI.

FIG. 4A illustrates an example user interface 101B that may be displayed to a second user associated with a second computing device 106B. This example involves the display of a graphical element 201B of a recommendation generated by the second computing device. In this case, although multiple recommendations may be prioritized, this example shows an instruction for a user to make a manual adjustment before a software-based adjustment is invoked. By having a user first make a manual adjustment before invoking an automatic, computer-controlled adjustment, the system can preserve computing resources at the first client computer. In this example, the graphical element 201B may be in the form of a silhouette that directs the user to a certain position. This may allow the client to resolve the anomaly without requiring further use of computing resources to adjust the video data.

FIG. 4B illustrates an example user interface 101N that may be displayed to another user associated with a Nth computing device 106N. This example involves the display of a graphical element 201D of a recommendation generated by the computing device. In this case, although multiple recommendations may be prioritized, including software adjustments to a video stream having the anomaly, this example shows an instruction for a user to make a manual adjustment before a software-based adjustment is invoked. By providing instructions to a user to first make a manual adjustment before invoking an automatic, computer-controlled adjustment, the system can preserve computing resources at the first client computer. In this example, the graphical element 201D may be in the form of an instruction for a user to make automatic adjustments to a light, e.g., turn a light down. In this case, the system may prioritize this adjustment over other adjustments based on the fact that a light is detected within the environment and position behind the user causing the anomaly.

FIG. 4C shows an example of the user interfaces of a communication session after the adjustments have been executed. As shown, the renderings, such as the second rendering 161B' and the Nth rendering 161N', show more consistent perspectives of each user and more consistent lighting results based on the calibration metadata shared between the computing devices.

Figure 5:
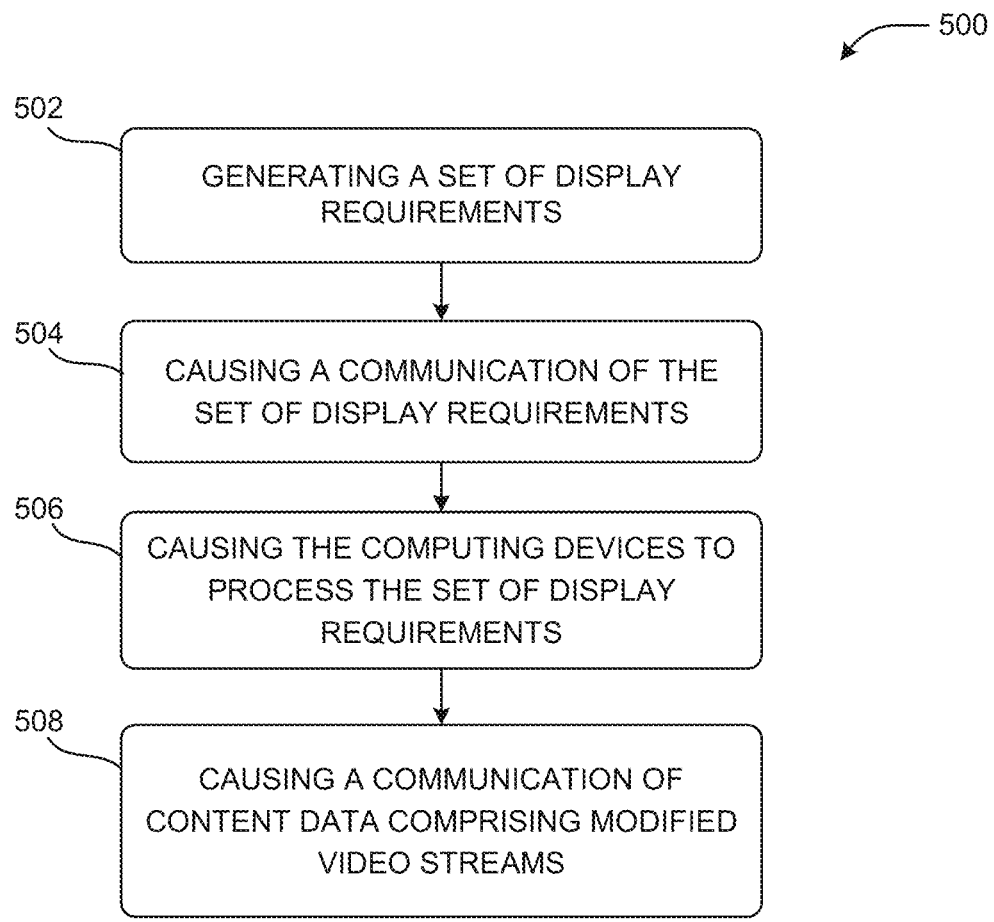
FIG. 5 is a flow diagram showing aspects of a routine for processing visual anomalies of video streams of a communication system.

FIG. 5 is a diagram illustrating aspects of a routine 500 for distributing and offloading a workload to a number of computers of a system. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 5 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

Generally described, the routine causes a system to manage a conference video processing. The system can offload processing individual video streams to specific client devices during a video conference, by transmitting display metric metadata from server to each client, where the metadata instructs each client parameters how the video should be configured before the stream is sent to the server. The routine can be configured for distributing video data processing tasks for optimizing a display of concurrently rendered video streams 151A-151N for a communication system 100.

The routine 500 includes an operation 502 where the system causes one or more computing devices to generate a set of display requirements 152. The set of display requirements 152 can be configured to cause a server 110 or a plurality of computing devices 106A-106N of the communication system 100 to analyze one or more display parameters 195 of the video streams 151A-151N generated by the computing devices 106A-106N, wherein the set of display requirements 152 causes the analysis of the one or more display parameters 195 of the video streams 151A-151N to coordinate according to the set of display requirements 152. The analysis can be performed at the server, at the client devices, or a combination thereof.

In some embodiments, as shown in FIGS. 1A & 2A, the server generates the reference display requirements by analyzing a desired target display result. The server can generate the reference display requirements by analyzing initial video streams arriving from the devices. The server can generate the reference display requirements by analyzing other information such as the device specification metadata 153 received from the clients.

Next, at operation 504, the system causes one or more computing devices to communicate of the set of display requirements 152 from the server 110 to the computing devices 106A-106N, wherein the computing devices 106A-106N are configured to generate and communicate the video streams 151A-151N to the server 110. An example of this can be shown on FIG. 1A. Server sends reference display requirements to a plurality of client devices, each client device configured to stream video data to the server.

Next, at operation 506, the system causes one or more computing devices 106A-106N or 110 to process the set of display requirements 152 to generate modified video streams 161A-161N having one or more modified display parameters 195' that includes an adjustment of the one or more display parameters 195 according to the set of display requirements 152, wherein the computing devices 106A-106N generate the modified video streams 161A-161N prior to sending the modified video streams 161A-161N to the server 110. In some configurations, as shown in FIGS. 1B & 2B, the reference display requirements instruct each client device how it should process its video stream the stream is sent to the server. In response to the reference display requirements received from the server, each client device adjusts or processes its video stream according to the requirements before the video stream is sent to the server.

Next, at operation 508, the system causes one or more computing devices, such as the server or any other computer functioning as a communication manager, to communicate of content data 650 comprising the modified video streams 161A-161N for causing a display of user interfaces 101A-101N on one or more of the computing devices 106A-106N, the user interfaces 101A-101N comprising renderings 161A'-161N' of the modified video streams 151A'-151N', wherein the renderings of the modified video streams are generated for compliance with the set of display requirements 152 for providing a coordinated display of the modified video streams 151A'-151N' concurrently displayed within the user interfaces. In operation 508, the server can perform operations to provide communication session functions to display the resulting user interface and produce the technical effects.

In some configurations, the set of display requirements is configured according to the device specification data, wherein the set of display requirements defines one or more display thresholds that are based on at least one of a specification of a light, a specification of lens, or a specification of a camera of at least one client computer of the computing devices, wherein the display threshold can cause a modification to an individual video steam if the video stream comprises a display parameter that is not compliant with at least one display threshold. The display requirements are configured according to the specifications of each client.

For example, if one client has a camera with a limited viewing area, e.g., limited to a pixel width of 480 pixels, that client can communicate those limitations, in the form of hardware or software specifications, can be communicated to the server via the device specification data. The server can then generate the set of display requirements using the device specification data defining the limitation of the one client. The server then shares that set of display requirements with all clients to enable each client to generate streams that are all based on the width limitation of 480 pixels. That way when the streams are all combined in one user interface, the renderings of the streams are all coordinated. In another example, if a camera arrangement of one client only allows a person to take 50% of a display area of video data generated from their computer, that same limitation can be shared with the other clients using the set of display requirements. Such limitations can apply to light levels, contrast levels, object positions within a video image, etc.

In some configurations, the set of display requirements defines one or more display thresholds for at least one of a position of a rendered object or a size of a rendered object. The adjustment of the one or more display parameters comprises generating the modified video streams having one or more modified display parameters defining a new position of the rendered object or a new size of the rendered object that are modified to be compliant with the one or more display thresholds for at least one of a position of the rendered object or a size of the rendered object.

In some configurations, the set of display requirements defines a size threshold for a rendered object, wherein the adjustment of the one or more display parameters comprises generating the modified video streams having one or more modified display parameters defining an adjusted size of the rendered object that is modified for compliance with the size threshold for coordinating the video data generated by the computing devices. This allows a system to include a size threshold that controls each image of each client to coordinate on the scale of the images generated by the clients.

In some configurations, the set of display requirements defines a position threshold for a rendered object, wherein the adjustment of the one or more display parameters comprises generating the modified video streams having one or more modified display parameters defining an adjusted position of the rendered object that is modified for compliance with the position threshold for coordinating the video data generated by the computing devices. This allows a system to include a position threshold that allows each image to coordinate on the position of the objects of the images generated by the clients.

In some configurations, the set of display requirements defines one or more display thresholds for at least one of a brightness level of a rendered object or a contrast level of a rendered object. The adjustment of the one or more display parameters comprises generating the modified video streams having one or more modified display parameters defining a new brightness level of the rendered object or a new contrast level of the rendered object that are modified for compliance with at least a brightness level of the rendered object or a contrast level of the rendered object.

In some configurations, the set of display requirements defines a brightness threshold for a rendered object, wherein the adjustment of the one or more display parameters comprises generating the modified video streams having one or more modified display parameters defining an adjusted brightness level of the rendered object that is modified for compliance with the brightness threshold for coordinating the video data generated by the computing devices. The display requirements include a brightness threshold that allows each image to coordinate on the brightness level of the objects of the images generated by the clients.

In some configurations, the set of display requirements defines a contrast level threshold for the analysis of the video streams, wherein the adjustment of the one or more display parameters comprises generating the modified video streams having one or more modified display parameters defining an adjusted contrast level that is modified for compliance with the contrast level threshold for coordinating the video data generated by the computing devices. The display requirements include a brightness threshold that allows each image to coordinate on the contrast level of the images generated by the clients.

In some configurations, the contrast level threshold and the adjusted contrast level are based on a selected area of a rendered object and a selected area of a background image. For instance, a contract level may be measured by a particular area of a rendering of a person, e.g., within a predetermined distance of a person's eyes, and a particular area of a rendering of a background, e.g., the area around a person's face. If those two areas have a contrast that exceeds or does not exceed a threshold, the system may determine that an adjustment is needed and then select an adjustment type or parameters of an adjustment based on those measured values.

One or more operations can also include ranking a number of different types of adjustments. The ranking can be based on the mobility of a light or camera. If a light or camera is mobile, the ranking can be place higher than a software-based adjustment that adjusts the brightness or a position of an object on an ongoing basis.

Figure 6:
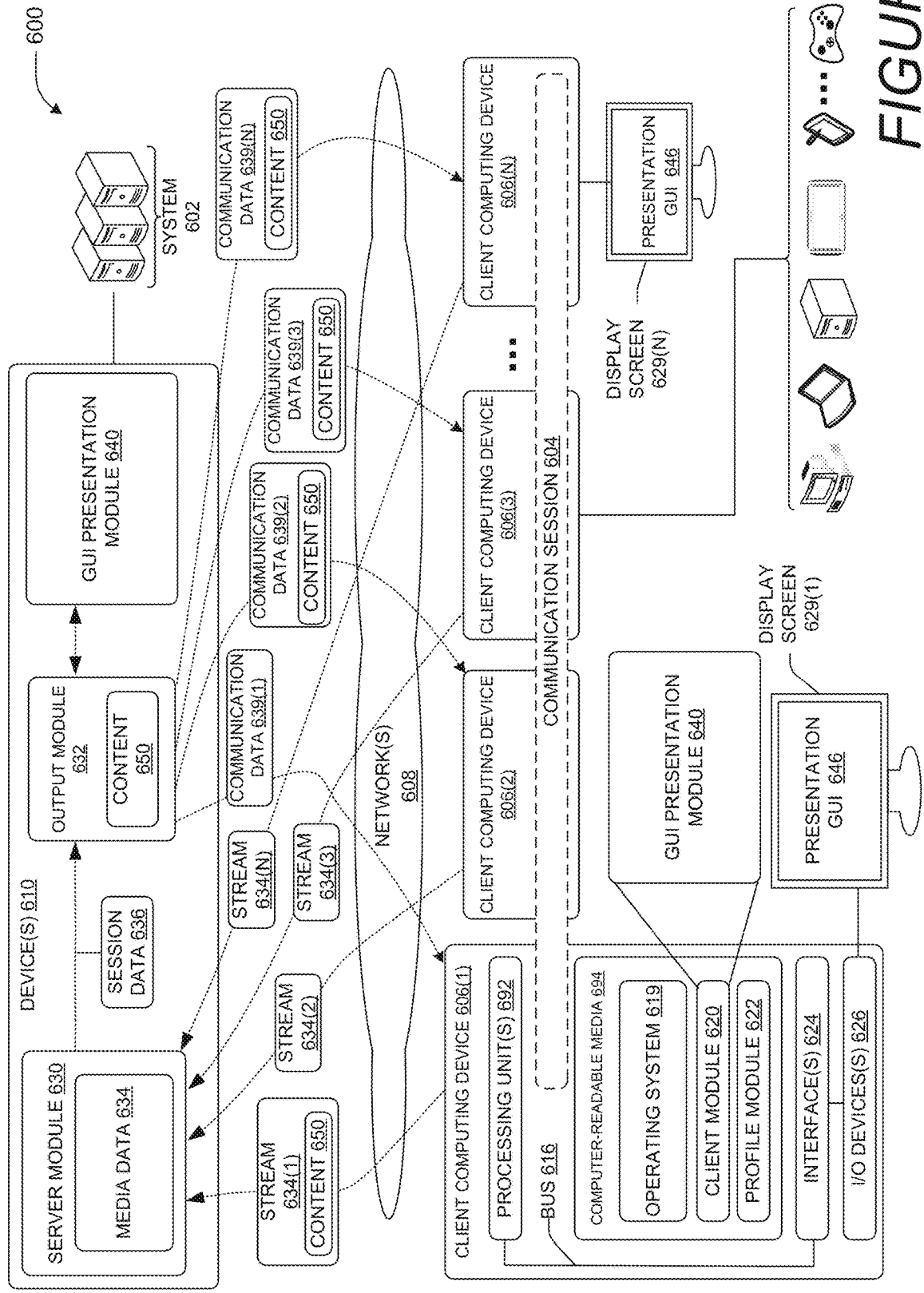
FIG. 6 is a computing system diagram showing aspects of an illustrative operating environment for the techniques disclosed herein.

FIG. 6 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 6, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 7:
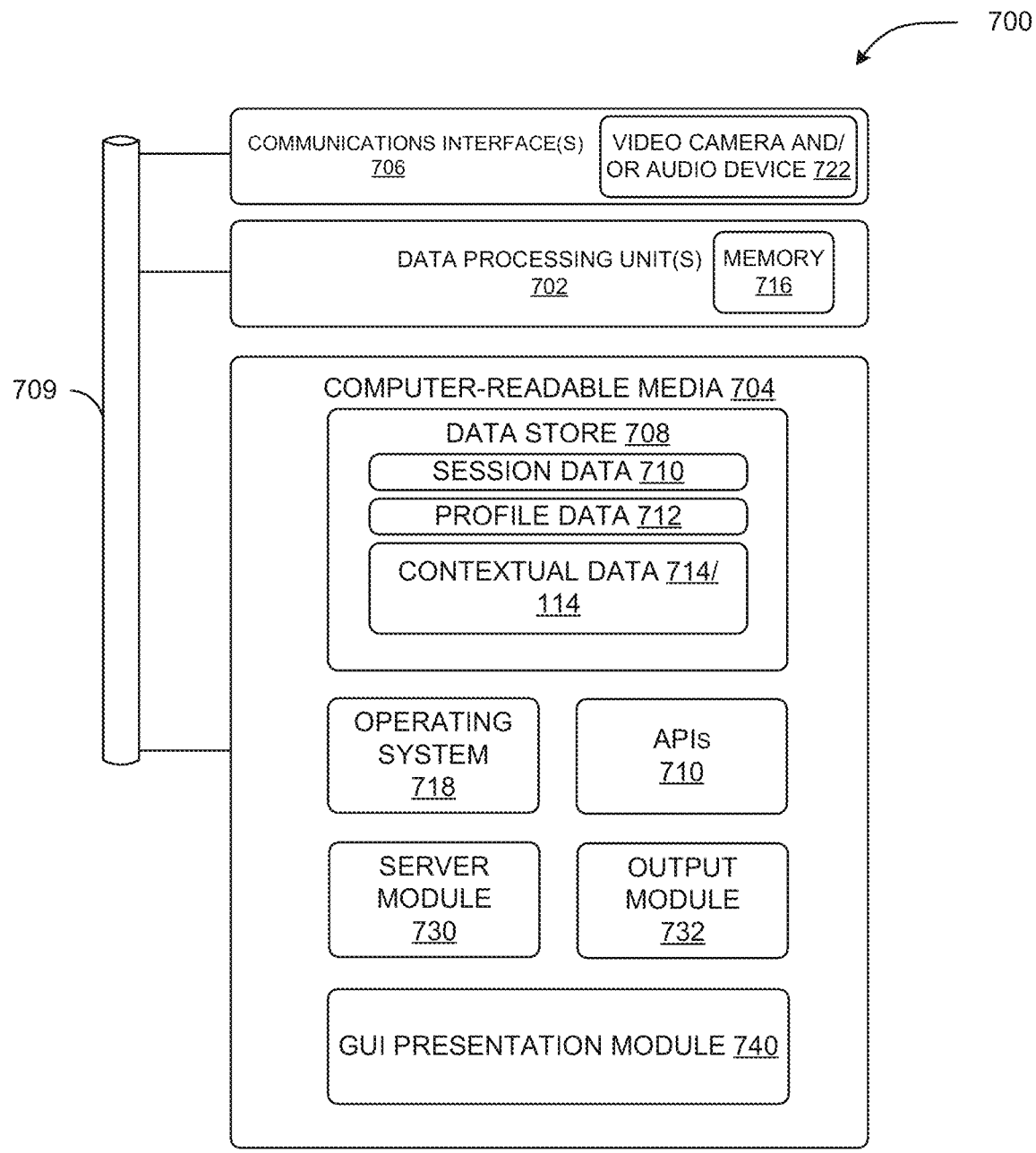
FIG. 7 is a computing architecture diagram showing aspects of the configuration and operation of a computing device that can implement aspects of the techniques disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 6), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for distributing video data processing for correcting video streams received from a plurality of computing devices of a communication system, the method comprising:
generating, at the communication system, a set of display requirements configured to cause a server or the plurality of computing devices of the communication system to analyze one or more display parameters of the video streams generated by the computing devices, wherein the set of display requirements causes the analysis of the one or more display parameters of the video streams to coordinate according to the set of display requirements;
causing a communication of the set of display requirements from the server to the computing devices, wherein the computing devices are configured to generate and communicate the video streams to the server;
causing the computing devices to generate modified video streams having one or more modified display parameters that includes an adjustment of the one or more display parameters according to the set of display requirements, wherein the computing devices generate the modified video streams prior to sending the modified video streams to the server; and
causing a communication of content data comprising the modified video streams for causing a display of user interfaces on one or more of the computing devices, the user interfaces comprising renderings of the modified video streams, wherein the renderings of the modified video streams are generated for compliance with the set of display requirements for providing a coordinated display of the modified video streams concurrently displayed within the user interfaces.

2. The method of claim 1, wherein the set of display requirements is configured according to the device specification data, wherein the set of display requirements defines one or more display thresholds that are based on at least one of a specification of a light, a specification of lens, or a specification of a camera of at least one client computer of the computing devices, wherein the display threshold can cause a modification to an individual video steam if the video stream comprises a display parameter that is not compliant with at least one display threshold.

3. The method of claim 1, wherein the set of display requirements defines one or more display thresholds for at least one of a position of a rendered object or a size of a rendered object, wherein the adjustment of the one or more display parameters comprises generating the modified video streams having one or more modified display parameters defining a new position of the rendered object or a new size of the rendered object that are modified to be compliant with the one or more display thresholds for at least one of the position of the rendered object or the size of the rendered object.

4. The method of claim 1, wherein the set of display requirements defines a size threshold for a rendered object, wherein the adjustment of the one or more display parameters comprises generating the modified video streams having one or more modified display parameters defining an adjusted size of the rendered object that is modified for compliance with the size threshold for coordinating the video data generated by the computing devices.

5. The method of claim 1, wherein the set of display requirements defines a position threshold for a rendered object, wherein the adjustment of the one or more display parameters comprises generating the modified video streams having one or more modified display parameters defining an adjusted position of the rendered object that is modified for compliance with the position threshold for coordinating the video data generated by the computing devices.

6. The method of claim 1, wherein the set of display requirements defines one or more display thresholds for at least one of a brightness level of a rendered object or a contrast level of a rendered object, wherein the adjustment of the one or more display parameters comprises generating the modified video streams having one or more modified display parameters defining a new brightness level of the rendered object or a new contrast level of the rendered object that are modified for compliance with at least one of the brightness level of the rendered object or the contrast level of the rendered object.

7. The method of claim 1, wherein the set of display requirements defines a brightness threshold for a rendered object, wherein the adjustment of the one or more display parameters comprises generating the modified video streams having one or more modified display parameters defining an adjusted brightness level of the rendered object that is modified for compliance with the brightness threshold for coordinating the video data generated by the computing devices.

8. The method of claim 1, wherein the set of display requirements defines a contrast level threshold for the analysis of the video streams, wherein the adjustment of the one or more display parameters comprises generating the modified video streams having one or more modified display parameters defining an adjusted contrast level that is modified for compliance with the contrast level threshold for coordinating the video data generated by the computing devices.

9. The method of claim 8, wherein the contrast level threshold and the adjusted contrast level are based on a selected area of a rendered object and a selected area of a background image.

10. The method of claim 1, wherein the communication of the set of display requirements from the server to the computing devices enables the computing devices to generate coordinated video streams to offload video processing tasks for the adjustment of the one or more display parameters according to the set of display requirements from the server to the computing devices.

11. A system for distributing video data processing tasks for optimizing a display of concurrently rendered video streams generated by computing devices in communication with the system, the system comprising:
one or more data processing units; and
a computer-readable medium having encoded thereon computer-executable instructions to cause the one or more data processing units to:
generate a set of display requirements configured to cause the computing devices to analyze one or more display parameters of the video streams generated by the computing devices, wherein the set of display requirements causes the analysis of the one or more display parameters of the video streams to coordinate between the computing devices according to the set of display requirements;
cause a communication of the set of display requirements from the system (10) to the computing devices, wherein the computing devices are configured to generate and communicate the video streams to the system;
cause the computing devices to process the set of display requirements to generate modified video streams having one or more modified display parameters (195') that includes an adjustment of the one or more display parameters according to the set of display requirements, wherein the computing devices generate the modified video streams prior to sending the modified video streams to the system; and
cause a communication of content data comprising the modified video streams for causing a display of user interfaces on one or more of the computing devices, the user interfaces comprising renderings of the modified video streams, wherein the renderings of the modified video streams are generated for compliance with the set of display requirements for providing a coordinated display of the modified video streams concurrently displayed within the user interfaces.

12. The system of claim 11, wherein the set of display requirements is configured according to the device specification data, wherein the set of display requirements defines one or more display thresholds that are adjusted based on at least one of a specification of a light, a specification of lens, or a specification of a camera of at least one client computer of the computing devices, wherein the display threshold can cause a modification to an individual video steam if the video stream comprises a display parameter that is not compliant with at least one display threshold.

13. The system of claim 11, wherein the set of display requirements defines one or more display thresholds for at least one of a position of a rendered object or a size of a rendered object, wherein the adjustment of the one or more display parameters comprises generating the modified video streams having one or more modified display parameters defining a new position of the rendered object or a new size of the rendered object that are modified to be compliant with the one or more display thresholds for at least one of the position of the rendered object or the size of the rendered object.

14. The system of claim 11, wherein the set of display requirements defines a size threshold for a rendered object, wherein the adjustment of the one or more display parameters comprises generating the modified video streams having one or more modified display parameters defining an adjusted size of the rendered object that is modified for compliance with the size threshold for coordinating the video data generated by the computing devices.

15. The system of claim 11, wherein the set of display requirements defines a position threshold for a rendered object, wherein the adjustment of the one or more display parameters comprises generating the modified video streams having one or more modified display parameters defining an adjusted position of the rendered object that is modified for compliance with the position threshold for coordinating the video data generated by the computing devices.

16. A computer-readable storage medium of a system for distributing video data processing tasks for optimizing a display of concurrently rendered video streams generated by computing devices in communication with the system, the computer-readable storage medium having encoded thereon computer-executable instructions to cause one or more processing units to:
generate a set of display requirements configured to cause the computing devices to analyze one or more display parameters of the video streams generated by the computing devices, wherein the set of display requirements causes the analysis of the one or more display parameters of the video streams to coordinate between the computing devices according to the set of display requirements;
cause a communication of the set of display requirements from the system (10) to the computing devices, wherein the computing devices are configured to generate and communicate the video streams to the system;
cause the computing devices to process the set of display requirements to generate modified video streams having one or more modified display parameters that includes an adjustment of the one or more display parameters according to the set of display requirements, wherein the computing devices generate the modified video streams prior to sending the modified video streams to the system; and
cause a communication of content data comprising the modified video streams for causing a display of user interfaces on one or more of the computing devices, the user interfaces comprising renderings of the modified video streams, wherein the renderings of the modified video streams are generated for compliance with the set of display requirements for providing a coordinated display of the modified video streams concurrently displayed within the user interfaces.

17. The computer-readable storage medium claim 16, wherein the set of display requirements defines one or more display thresholds for at least one of a position of a rendered object or a size of a rendered object, wherein the adjustment of the one or more display parameters comprises generating the modified video streams having one or more modified display parameters defining a new position of the rendered object or a new size of the rendered object that are modified to be compliant with the one or more display thresholds for at least one of the position of the rendered object or the size of the rendered object.

18. The computer-readable storage medium claim 16, wherein the set of display requirements defines a size threshold for a rendered object, wherein the adjustment of the one or more display parameters comprises generating the modified video streams having one or more modified display parameters defining an adjusted size of the rendered object that is modified for compliance with the size threshold for coordinating the video data generated by the computing devices.

19. The computer-readable storage medium claim 16, wherein the set of display requirements defines a position threshold for a rendered object, wherein the adjustment of the one or more display parameters comprises generating the modified video streams having one or more modified display parameters defining an adjusted position of the rendered object that is modified for compliance with the position threshold for coordinating the video data generated by the computing devices.

20. The computer-readable storage medium claim 16, wherein the set of display requirements defines one or more display thresholds for at least one of a brightness level of a rendered object or a contrast level of a rendered object, wherein the adjustment of the one or more display parameters comprises generating the modified video streams having one or more modified display parameters defining a new brightness level of the rendered object or a new contrast level of the rendered object that are modified for compliance with at least one of the brightness level of the rendered object or the contrast level of the rendered object.

* * * * *